United States Patent
Liu et al.

(10) Patent No.: US 11,908,102 B2
(45) Date of Patent: Feb. 20, 2024

(54) IMAGE PROCESSING METHOD AND DEVICE, TRAINING METHOD OF NEURAL NETWORK, AND STORAGE MEDIUM

(71) Applicant: BOE TECHNOLOGY GROUP CO., LTD., Beijing (CN)

(72) Inventors: Hanwen Liu, Beijing (CN); Pablo Navarrete Michelini, Beijing (CN); Dan Zhu, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 415 days.

(21) Appl. No.: 17/281,291

(22) PCT Filed: May 28, 2020

(86) PCT No.: PCT/CN2020/092917
§ 371 (c)(1),
(2) Date: Mar. 30, 2021

(87) PCT Pub. No.: WO2020/239026
PCT Pub. Date: Dec. 3, 2020

(65) Prior Publication Data
US 2021/0407041 A1    Dec. 30, 2021

(30) Foreign Application Priority Data
May 30, 2019   (CN) .................. 201910463969.5

(51) Int. Cl.
*G06N 3/045*   (2023.01)
*G06N 3/08*    (2023.01)

(52) U.S. Cl.
CPC .......... *G06T 3/4046* (2013.01); *G06N 3/045* (2023.01); *G06N 3/08* (2013.01)

(58) Field of Classification Search
CPC ......... G06T 3/4046; G06T 1/00; G06N 3/045; G06N 3/08; G06N 3/084; G06V 10/82; G06V 10/56; G06F 18/214
See application file for complete search history.

(56) References Cited

U.S. PATENT DOCUMENTS

| 11,069,047 B2 | 7/2021 | Liu et al. |
| 2015/0063688 A1 | 3/2015 | Bhardwaj et al. |

(Continued)

FOREIGN PATENT DOCUMENTS

| CN | 105528589 A | 4/2016 | |
| CN | 107527044 A * | 12/2017 | ......... G06K 9/00825 |

(Continued)

OTHER PUBLICATIONS

Wang et al, Deeply Supervised Face Completion with Multi-Context Generative Adversarial Network, 2019, IEEE Signal Processing Letters, 26(3):400-405. (Year: 2019).*

(Continued)

*Primary Examiner* — John Villecco
*Assistant Examiner* — Kathleen M Broughton
(74) *Attorney, Agent, or Firm* — Chiwin Law LLC

(57) ABSTRACT

Disclosed are an image processing method and device, a training method of a neural network and a storage medium. The image processing method includes: obtaining an input image, and processing the input image by using a generative network to generate an output image. The generate network includes a first sub-network and at least one second sub-network, and the processing the input image by using the generative network to generate the output image includes, processing the input image by using the first sub-network to obtain a plurality of first feature images; performing a branching process and a weight sharing process on the plurality of first feature images by using the at least one (Continued)

second sub-network to obtain a plurality of second feature images; and processing the plurality of second feature images to obtain the output image.

17 Claims, 12 Drawing Sheets

(56) References Cited

U.S. PATENT DOCUMENTS

| | | | |
|---|---|---|---|
| 2019/0087677 A1* | 3/2019 | Wolf | G06V 30/226 |
| 2019/0138838 A1* | 5/2019 | Liu | G06V 10/764 |
| 2019/0220746 A1 | 7/2019 | Liu et al. | |
| 2021/0233214 A1 | 7/2021 | Liu et al. | |

FOREIGN PATENT DOCUMENTS

| | | | | |
|---|---|---|---|---|
| CN | 107767343 A | * | 3/2018 | ............ G06K 9/40 |
| CN | 109033107 A | | 12/2018 | |
| CN | 109191382 A | | 1/2019 | |
| CN | 109241880 A | | 1/2019 | |
| CN | 109255317 A | | 1/2019 | |
| CN | 109299733 A | | 2/2019 | |
| CN | 109426858 A | | 3/2019 | |
| CN | 109559287 A | | 4/2019 | |
| CN | 109816612 A | | 5/2019 | |
| CN | 109816764 A | * | 5/2019 | ............ G06N 3/0454 |
| CN | 110188776 A | | 8/2019 | |
| WO | WO-2019020075 A1 | * | 1/2019 | ............ G06K 9/4671 |

OTHER PUBLICATIONS

Wang et al, Deeply Supervised Face Completion with Multi-Context Generative Adversarial Network, Mar. 2019, IEEE Signal Processing Letters, 26(3): 400-405. (Year: 2019).*

First office action issued in Chinese Patent Application No. 201910463969.5 with search report.

"DSLR-Quality Photos on Mobile Devices with Deep Convolutional Networks", A. Ignatov et al, Sep. 5, 2017, @vision.ee.ethz.ch; Computer Lab. ETH, Zurich.

"AIM 2019 Challenge on Bokeh Effect Synthesis: Methods & Results", A. Ignatov et al, Inatov-ICCVW-2019b, @ai-benchmark/research.

"AIM 2019 Challenge on RAW to RGB Mapping: Methods & Results", A. Ignatov et al, Inatov-ICCVW-2019c, @ai-benchmark/research.

"Stochastic Gradient Decent", Wikipedia, https://en.wikipedia.org/wiki/Stochastic_gradient_descent.

"YUV", Wikipedia, https://en.wikipedia.org/wiki/YUV.

* cited by examiner

IMAGE PROCESSING METHOD AND DEVICE, TRAINING METHOD OF NEURAL NETWORK, AND STORAGE MEDIUM

This application is a U.S. National Phase Entry of International Application No. PCT/CN2020/092917 filed on May 28, 2020, designating the United States of America and claiming priority to Chinese Patent Application No. 201910463969.5, filed on May 30, 2019. The present application claims priority to and the benefit of the above-identified applications and the above-identified applications are incorporated by reference herein in their entirety.

TECHNICAL FIELD

Embodiments of the present disclosure relate to an image processing method, an image processing device, a training method of a neural network, and a storage medium.

BACKGROUND

Currently, deep learning technology based on artificial neural networks has made great progress in fields such as object classification, text processing, recommendation engine, image search, facial recognition, age and speech recognition, man-machine conversation and emotion calculation, etc. With the deepening of artificial neural network structures and the improvement of algorithms, the deep learning technology has made a breakthrough in the field of humanoid data perception. The deep learning technology can be used to describe image content, to identify objects, which are in complex environments, in images, and to perform speech recognition in noisy environments. At the same time, the deep learning technology can also solve the problem of image generation and fusion.

SUMMARY

At least one embodiment of the present disclosure provides an image processing method, which includes: obtaining an input image; and processing the input image by using a generative network to generate an output image, wherein the generative network includes a first sub-network and at least one second sub-network, and the processing the input image by using the generative network to generate the output image includes: processing the input image by using the first sub-network to obtain a plurality of first feature images; performing a branching process and a weight sharing process on the plurality of first feature images by using the at least one second sub-network to obtain a plurality of second feature images; and processing the plurality of second feature images to obtain the output image.

For example, in the image processing method provided by some embodiments of the present disclosure, each second sub-network includes a first branch network, a second branch network and a third branch network, and the branching process of the each second sub-network includes: dividing an input of the each second sub-network into a first branch input, a second branch input and a third branch input; and processing the first branch input by using the first branch network to obtain a first branch output, processing the second branch input by using the second branch network to obtain a second branch output, and processing the third branch input by using the third branch network to obtain a third branch output; the at least one second sub-network includes a first-sequence second sub-network, the first-sequence second sub-network is connected to the first sub-network, and the plurality of first feature images serve as an input of the first-sequence second sub-network.

For example, in the image processing method provided by some embodiments of the present disclosure, each second sub-network further includes a first backbone network, and the weight sharing process of each second sub-network includes: concatenating the first branch output, the second branch output and the third branch output to obtain a first intermediate output; and processing the first intermediate output by using the first backbone network to obtain an output of the each second sub-network.

For example, in the image processing method provided by some embodiments of the present disclosure, a process of the first branch network includes a standard convolution process, a process of the second branch network includes a standard convolution process, a process of the third branch network includes a standard convolution process, and a process of the first backbone network includes a standard convolution process and a down-sampling process.

For example, in the image processing method provided by some embodiments of the present disclosure, the generative network further includes a third sub-network, and the processing the plurality of second feature images to obtain the output image, includes: processing the plurality of second feature images to obtain a plurality of third feature images; processing the plurality of third feature images by using the third sub-network to obtain a plurality of fourth feature images; and performing a synthesis process on the plurality of fourth feature images to obtain the output image.

For example, in the image processing method provided by some embodiments of the present disclosure, the third sub-network includes a second backbone network, a fourth branch network, a fifth branch network, and a sixth branch network, the processing the plurality of third feature images by using the third sub-network to obtain the plurality of fourth feature images, includes: processing the plurality of third feature images by using the second backbone network to obtain a plurality of fifth feature images; dividing the plurality of fifth feature images into a fourth branch input, a fifth branch input, and a sixth branch input; and processing the fourth branch input by using the fourth branch network to obtain a fourth feature image corresponding to the fourth branch network, processing the fifth branch input by using the fifth branch network to obtain a fourth feature image corresponding to the fifth branch network, and processing the sixth branch input by using the sixth branch network to obtain a fourth feature image corresponding to the sixth branch network; and the plurality of fourth feature images includes the fourth feature image corresponding to the fourth branch network, the fourth feature image corresponding to the fifth branch network and the fourth feature image corresponding to the sixth branch network.

For example, in the image processing method provided by some embodiments of the present disclosure, a process of the second backbone network includes an up-sampling process, a process of the fourth branch network includes a standard convolution process, a process of the fifth branch network includes a standard convolution process, and a process of the sixth branch network includes a standard convolution process.

For example, in the image processing method provided by some embodiments of the present disclosure, the process of the fourth branch network further includes an up-sampling process, the process of the fifth branch network further includes an up-sampling process, and the process of the sixth branch network further includes an up-sampling process.

For example, in the image processing method provided by some embodiments of the present disclosure, a process of the first sub-network includes a standard convolution process, and the processing the input image by using the first sub-network to obtain the plurality of first feature images, includes: performing the standard convolution process on the input image by using the first sub-network to obtain the plurality of first feature images.

For example, in the image processing method provided by some embodiments of the present disclosure, the input image has a first color channel, a second color channel, and a third color channel, the first sub-network includes a conversion module, a seventh branch network, an eighth branch network, a ninth branch network, and a third backbone network, and the processing the input image by using the first sub-network to obtain the plurality of first feature images, includes: converting, by using the conversion module, data information of the first color channel, the second color channel and the third color channel of the input image into data information of a first luminance channel, a first color difference channel and a second color difference channel of an intermediate input image; processing data information of the first luminance channel of the intermediate input image by using the seventh branch network to obtain a seventh branch output, processing data information of the first color difference channel of the intermediate input image by using the eighth branch network to obtain an eighth branch output, and processing data information of the second color difference channel of the intermediate input image by using the ninth branch network to obtain a ninth branch output; concatenating the seventh branch output, the eighth branch output and the ninth branch output to obtain a second intermediate output; and processing the second intermediate output by using the third backbone network to obtain the plurality of first feature images.

For example, in the image processing method provided by some embodiments of the present disclosure, a process of the seventh branch network includes a standard convolution process and a down-sampling process, a process of the eighth branch network includes a standard down-sampling process, and a process of the ninth branch network includes a standard down-sampling process.

For example, in the image processing method provided by some embodiments of the present disclosure, a process of the fourth branch network includes a standard convolution process and an up-sampling process, a process of the fifth branch network includes a standard convolution process and a standard up-sampling process, and a process of the sixth branch network includes a standard convolution process and a standard up-sampling process.

For example, in the image processing method provided by some embodiments of the present disclosure, the generative network further includes a dense sub-network, and the dense sub-network includes N dense modules, the processing the plurality of second feature images to obtain the plurality of third feature images, includes: processing the plurality of second feature images by using the dense sub-network to obtain the plurality of third feature images; wherein the plurality of second feature images serve as an input of a first dense module in the N dense modules, the plurality of second feature images are concatenated with outputs of i−1 dense modules which are before an i-th dense module in the N dense modules, to serve as an input of the i-th dense module, and the plurality of second feature images are concatenated with the output of each dense module to serve as the plurality of third feature images, where N and i are integers, N≥2, i≥2 and i≤N.

For example, in the image processing method provided by some embodiments of the present disclosure, a process of each dense module includes a dimension reduction process and a convolution process.

For example, in the image processing method provided by some embodiments of the present disclosure, the generative network further includes a synthesis module, the performing the synthesis process on the plurality of fourth feature images to obtain the output image, includes: performing the synthesis process on the plurality of fourth feature images by using the synthesis module to obtain the output image.

For example, in the image processing method provided by some embodiments of the present disclosure, the synthesis module includes a first conversion matrix, the performing the synthesis process on the plurality of fourth feature images by using the synthesis module to obtain the output image, includes: converting, by using the first conversion matrix, data information of the fourth feature image corresponding to the fourth branch network, data information of the fourth feature image corresponding to the fifth branch network and data information of the fourth feature image corresponding to the sixth branch network into data information of a first color channel, data information of a second color channel and data information of a third color channel of the output image, so as to obtain the output image.

At least one embodiment of the present disclosure further provides a training method of a neural network, which includes: training a discriminative network based on a generative network to be trained; training the generative network to be trained based on the discriminative network; and alternately executing the above training processes to obtain the generative network in the image processing method provided by any one embodiment of the present disclosure, wherein the training the generative network to be trained based on the discriminative network, includes: processing a first training input image by using the generative network to be trained to generate a first training output image; calculating a system loss value of the generative network to be trained through a system loss function based on the first training output image; and tuning parameters of the generative network to be trained based on the system loss value.

For example, in the training method provided by some embodiments of the present disclosure, the system loss function includes a generative network adversarial loss function, and the system loss value includes a generative network adversarial loss value; the generative network adversarial loss function is expressed as:

$$L_G = E_{z1 \sim P_{z1}(z)}[1 - \log D(G(z1))],$$

where $L_G$ represents the generative network adversarial loss function, z1 represents the first training input image, $P_{z1}(z1)$ represents a set of first training input images, G(z1) represents the first training output image, D(G(z1)) represents an output of the discriminative network based on the first training input image, and $E_{z1 \sim P_{z1}(z1)}$ represents that an expectation value corresponding to the set of first training input images is calculated to obtain the generative network adversarial loss value.

For example, in the training method provided by some embodiments of the present disclosure, the system loss function includes a generative network adversarial loss function, and the system loss value includes a generative network adversarial loss value; the generative network adversarial loss function is expressed as:

$$L_G = E_{z1 \sim P_{z1}(z)}[1 - \log D(G(z1))],$$

where $L_G$ represents the generative network adversarial loss function, z1 represents the first training input image, $P_{z1}(z1)$ represents a set of first training input images, G(z1) represents the first training output image, D(G(z1)) represents an output of the discriminative network based on the first training input image, and $E_{z1~P_{z1}(z1)}$ represents that an expectation value corresponding to the set of first training input images is calculated to obtain the generative network adversarial loss value.

For example, in the training method provided by some embodiments of the present disclosure, the system loss function further includes a content loss function, and the system loss value further includes a content loss value; the calculating the system loss value of the generative network to be trained through the system loss function based on the first training output image, includes: extracting a first content feature image of the first training input image and a second content feature image of the first training output image by using an analysis network, and calculating the content loss value of the generative network through the content loss function based on the first content feature image and the second content feature image, wherein the analysis network includes at least one convolution module configured for extracting the first content feature image and the second content feature image;

the content loss function is expressed as:

$$L_{content} = \sum_m W_{1m} \cdot C_m,$$

where $L_{content}$ represents the content loss function, $C_m$ represents a single-layer content loss function of an m-th convolution module in the at least one convolution module, and $w_{1m}$ represents a weight of $C_m$;

the single-layer content loss function is expressed as:

$$C_m = \frac{1}{2S_1} \sum_{ij} (F_{ij}^m - P_{ij}^m)^2,$$

where $S_1$ is a constant, $F_{ij}^m$ represents a value of a j-th position in the first content feature image of the first training input image extracted by an i-th convolution kernel in the m-th convolution module, and $P_{ij}^m$ represents a value of a j-th position in the second content feature image of the first training output image extracted by the i-th convolution kernel in the m-th convolution module.

For example, in the training method provided by some embodiments of the present disclosure, the system loss function further includes a color loss function, and the system loss value further includes a color loss value; the color loss function is expressed as:

$$L_{color} = abs(gaussian(G(z1))-gaussian(I1)),$$

where $L_{color}$ represents the color loss function, G(z1) represents the first training output image, I1 represents a second training input image, gaussian ( ) represents Gaussian blur operation, and abs ( ) represents absolute value operation; and a quality of the second training input image is higher than a quality of the first training input image.

For example, in the training method provided by some embodiments of the present disclosure, the first training output image has a first color channel, a second color channel, and a third color channel; the system loss function further includes a contrast loss function, and the system loss value further includes a contrast loss value; the contrast loss function is expressed as:

$$L_{L1}=0.299*abs(F_{G(z1)}-F_{I2})+0.587*abs(S_{G(z1)}-S_{I2})+0.299*abs(T_{G(z1)}-T_{I2}),$$

where $L_{L1}$ represents the contrast loss function, G(z1) represents the first training output image, I2 represents a third training input image, $F_{G(z1)}$, $S_{G(z1)}$ and $T_{G(z1)}$ represent data information of the first color channel, the second color channel and the third color channel of the first training output image, respectively, $F_{I2}$, $S_{I2}$ and $T_{I2}$ represent data information of the first color channel, the second color channel and the third color channel of the third training input image, respectively, and abs ( ) represents the absolute value operation; the third training input image has a same scene as the first training input image, and a quality of the third training input image is higher than a quality of the first training input image.

For example, in the training method provided by some embodiments of the present disclosure, the training the discriminative network based on the generative network to be trained, includes: processing a fourth training input image by using the generative network to be trained to generate a second training output image; calculating a discriminative network adversarial loss value through a discriminative network adversarial loss function based on the second training output image and a fifth training input image; and tuning parameters of the discriminative network according to the discriminative network adversarial loss value, wherein a quality of the fifth training input image is higher than quality of the fourth training input image.

For example, in the training method provided by some embodiments of the present disclosure, the discriminative network adversarial loss function is expressed as:

$$L_D=-E_{x~P_{data}(x)}[\log D(x)]-E_{z2~P_{z2}(z2)}[1-\log D(G(z2))],$$

where $L_D$ represents the discriminative network adversarial loss function, x represents the fifth training input image, $P_{data}(x)$ represents a set of fifth training input images, D(x) represents an output of the discriminative network based on the fifth training input image, $E_{x~P_{data}(x)}$ represents an expectation value corresponding to the set of fifth training input images, z2 represents the fourth training input image, $P_{z2}(z2)$ represents a set of fourth training input images, G(z2) represents the second training output image, and D(G(z2)) represents an output of the discriminative network based on the second training output image, and $E_{z~P_z}(z)$ represents an expectation value corresponding to the set of fourth training input images.

At least one embodiment of the present disclosure further provides an image processing device, which includes: a memory, configured to store computer readable instructions non-transitorily; and a processor, configured to execute the computer readable instructions, wherein upon the computer readable instructions being executed by the processor, the image processing method provided by any one embodiment of the present disclosure or the training method of the neural network provided by any one embodiment of the present disclosure is executed At least one embodiment of the present disclosure further provides a storage medium, storing computer readable instructions non-transitorily, wherein upon the computer readable instructions being executed by a computer, the image processing method provided by any one embodiment of the present disclosure or the training method of the neural network provided by any one embodiment of the present disclosure is executed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
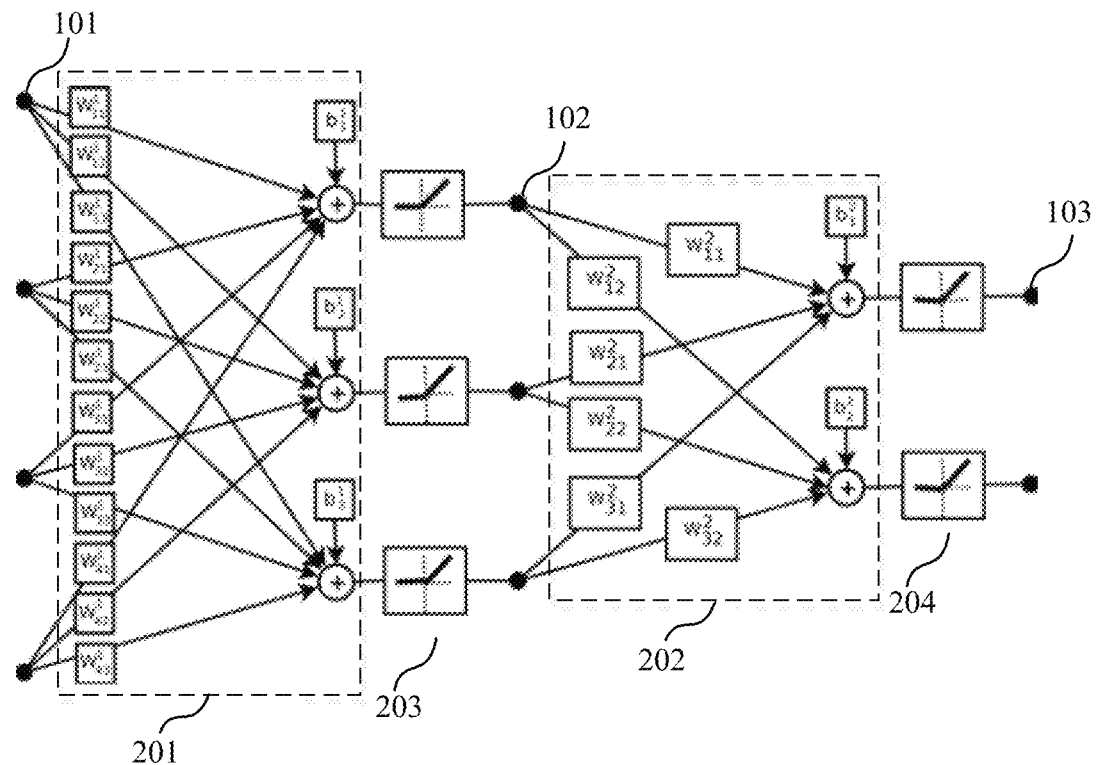
FIG. 1 is a schematic diagram of a convolutional neural network.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below with reference to some specific embodiments. In order to keep the following description of the embodiments of the present disclosure clear and concise, detailed descriptions of known functions and known components may be omitted. When any one component of an embodiment of the present disclosure appears in more than one of the accompanying drawings, the component is denoted by a same or similar reference numeral in each of the drawings.

Image enhancement is one of research hotspots in the field of image processing. Due to limitations of various physical factors (for instance, the size of the image sensor of a mobile phone camera is too small and limitations of other software and hardware of the mobile phone camera, etc.) and interference of environmental noise, the quality of an image is greatly degraded. The purpose of image enhancement is to improve a grayscale histogram of the image and increase the contrast of the image via image enhancement technology, so as to highlight details of the image and improve a visual effect of the image.

Image enhancement using a deep neural network is a novel technology arising with the development of deep learning technology. For instance, based on a convolutional neural network, low-quality photos (input images) taken by mobile phones can be processed to obtain high-quality output images, and the quality of the high-quality output images can be similar to the quality of photos taken by a digital single lens reflex camera (often referred to as DSLR). For instance, peak signal to noise ratio (PSNR) is often used to characterize image quality. The higher the PSNR value, the more similar the image is to the photo taken by the digital single mirror reflex camera.

For instance, Andrey Ignatov et al., propose an image enhancement method based on a convolutional neural network, which can be referred to the literature, Andrey Ignatov, Nikolay Kobyshev, Kenneth van Hoey, Radu Timoft, Luc van Gool, *DSLR-quality photos on mobile devices with deep convolutional networks*. ArXiv: 1704.02470v2 [cs.CV], Sep. 5, 2017. This literature is hereby incorporated by reference in its entirety as part of the present application. This method mainly uses convolution layers, batch normalization layers and residual layers to construct a single-scale convolution neural network, which can be used to process an low-quality input image (for instance, with low contrast, being underexposed or overexposed, being too dark or too bright overall, etc.) into a higher-quality image. By using color loss, texture loss and content loss in a loss function of the training process, a good processing effect can be achieved.

Initially, a convolutional neural network (CNN) is primarily used to identify two-dimensional shapes, and it is highly invariant to the shifting, scaling, tilting, or other forms of deformation of images. CNN mainly simplifies the complexity of the neural network model and reduces the number of weights through local perception field and weight sharing. With the development of deep learning technology, the application scope of CNN is not limited to the field of image recognition, and it can also be applied in the fields of face recognition, text recognition, animal classification, and image processing, etc.

FIG. 1 is a schematic diagram of a CNN. For instance, the CNN can be used for image processing, which uses images as input and output, and replaces scalar weights by convolution kernels. FIG. 1 only shows a CNN having a 3-layered structure, and the embodiments of the present disclosure are not limited to this case. As shown in FIG. 1, the CNN includes an input layer 101, a hidden layer 102, and an output layer 103. The input layer 101 has 4 inputs; the hidden layer 102 has 3 outputs; the output layer 103 has 2 outputs; and the CNN finally outputs 2 images.

For instance, the 4 inputs of the input layer 101 may be 4 images or 4 feature images of 1 image. The 3 outputs of the hidden layer 102 may be feature images of images inputted through the input layer 101.

For instance, as shown in FIG. 1, convolution layers have weight $w_{ij}^k$ and bias $b_i^k$. The weight $w_{ij}^k$ represents a convolution kernel, and the bias $b_i^k$ is a scalar superimposed on the output of the convolution layer, where k is the label of the input layer 101, and i and j are the labels of units of the input layer 101 and units of the hidden layer 102, respectively. For instance, a first convolution layer 201 includes a first set of convolution kernels ($w_{ij}^1$ in FIG. 1) and a first set of biases ($b_i^1$ in FIG. 1). A second convolution layer 202 includes a second set of convolution kernels ($w_{ij}^2$ in FIG. 1) and a second set of biases ($b_i^2$ in FIG. 1). In general, each convolution layer includes dozens or hundreds of convolution kernels. If being a deep CNN, the CNN may include at least five convolution layers.

For instance, as shown in FIG. 1, the CNN further includes a first activation layer 203 and a second activation layer 204. The first activation layer 203 is disposed after the first convolution layer 201, and the second activation layer 204 is disposed after the second convolution layer 202. The activation layer (for instance, the first activation layer 203 and the second activation layer 204) includes an activation function. The activation function is used to introduce non-linear factors into the CNN, so that the CNN can solve complex problems better. The activation function can include a rectified linear unit (ReLU) function, a sigmoid function, or a hyperbolic tangent function (tan h function), etc. The ReLU function is an unsaturated nonlinear function, and the sigmoid function and the tan h function are saturated nonlinear functions. For instance, the activation layer can be used alone as one layer of the CNN, or the activation layer can also be included in a convolution layer (for instance, the first convolution layer 201 may include the first activation layer 203, and the second convolution layer 202 may include the second activation layer 204).

For instance, in the first convolution layer 201, firstly, the output of the first convolution layer 201 is obtained by applying a plurality of convolution kernels $w_{ij}^1$ in the first set of convolution kernels and a plurality of biases $b_i^1$ in the first set of biases to each input; and then, the output of the first convolution layer 201 can be processed by the first activation layer 203, so as to obtain the output of the first activation layer 203. In the second convolution layer 202, firstly, the output of the second convolution layer 202 is obtained by applying a plurality of convolution kernels $w_{ij}^2$ in the second set of convolution kernels and a plurality of biases $b_i^2$ in the second set of biases to the output of the first activation layer 203 being inputted; and then, the output of the second convolution layer 202 can be processed by the second activation layer 204, so as to obtain the output of the second activation layer 204. For instance, the output of the first convolution layer 201 may be a result of applying the convolution kernels $w_{ij}^1$ to the input of the first convolution layer 201 and then adding the biases $b_i^1$, and the output of the second convolution layer 202 may be a result of applying the convolution kernels $w_{ij}^2$ to the output of the first activation layer 203 and then adding the biases $b_i^2$.

The CNN needs to be trained before being used for image processing. After being trained, the convolution kernels and the biases of the CNNs remain unchanged during image processing. In the training process, the convolution kernels and the biases are adjusted by using multiple sets of input/output sample images and optimization algorithms, so as to obtain an optimized CNN model.

Figure 2A:
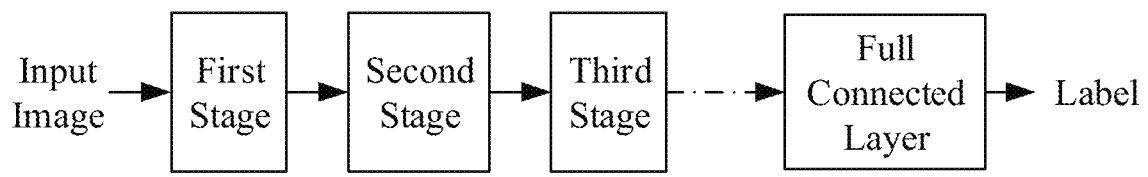
FIG. 2A is a schematic structural diagram of a convolutional neural network.
Figure 2B:
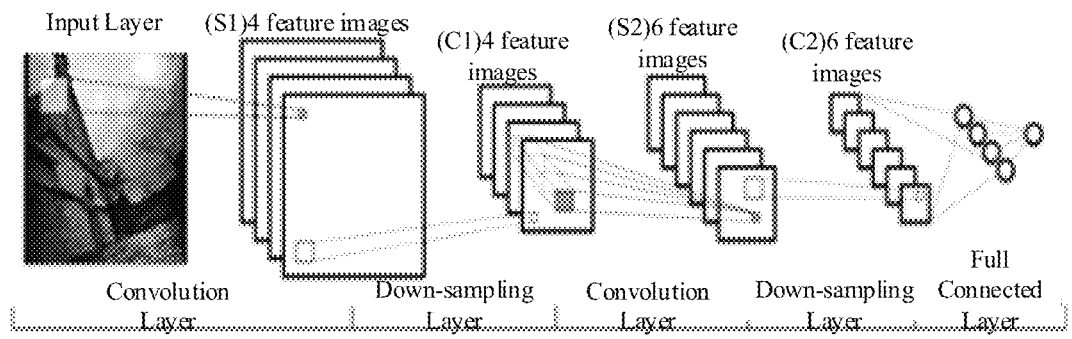
FIG. 2B is a schematic diagram illustrating a working process of a convolutional neural network.

FIG. 2A is a schematic structural diagram of a CNN, and FIG. 2B is a schematic diagram illustrating a working process of a CNN. For instance, as shown in FIGS. 2A-2B, after an input image is inputted to the CNN through an input layer, a label is outputted after several processing procedures (e.g., each stage in FIG. 2A). The CNN may mainly include multiple convolution layers, multiple down-sampling layers, and a fully connected layer. In the present disclosure, it should be understood that each of these layers such as the multiple convolution layers, the multiple down-sampling layers and the fully connected layer, refers to a corresponding process operation, i.e., a convolution process, a down-sampling process, a fully connected process, etc., and the described neural network also refers to corresponding process operations, and the instance normalization layer or layer normalization layer which will be described below is similar to this case, so its description will not be repeated here. For instance, a complete CNN can be formed by a superimposition of these three kinds of layers. For instance, FIG. 2A only shows three stages of the CNN, namely the first stage, the second stage and the third stage. For instance, each stage may include one convolution block and one down-sampling layer. For instance, each convolution block may include a convolution layer. Thus, the processing procedure of each stage may include: performing a convolution process and a down-sampling process on an input image. For instance, according to actual demands, each convolution block may further include an instance normalization layer, so the processing procedure of each stage may further include an instance normalization process.

For instance, the instance normalization layer is used to perform an instance normalization process on feature images, so as to change the grayscale values of pixels of the feature images into a predetermined range, thereby simplifying the image generation process and improving the image enhancement effect. For instance, the predetermined range may be [−1, 1]. According to the mean and variance of each feature image, the instance normalization layer performs an instance normalization process on the feature image. For instance, the instance normalization layer can also be used to perform an instance normalization process on a single image.

For instance, assuming that a size of mini-batch gradient decent method is T, the number of feature images outputted by a convolution layer is C, and each feature image is a matrix of H rows and W columns, the model of feature images is expressed as (T, C, W, H). Therefore, an instance normalization formula of an instance normalization layer can be expressed as:

$$y_{tijk} = \frac{x_{tijk} - \mu_{ti}}{\sqrt{\sigma_{ti}^2 + \varepsilon_1}}, \mu_{ti} = \frac{1}{HW}\sum_{l=1}^{H}\sum_{m=1}^{W}x_{tilm}, \sigma_{ti}^2 = \frac{1}{HW}\sum_{l=1}^{H}\sum_{m=1}^{W}(x_{tilm} - 1\mu_{ti})^2$$

where $x_{tijk}$ is a value corresponding to the t-th feature patch, the i-th feature image, the j-th row and the k-th column in the set of feature images outputted by the convolution layer, $y_{tijk}$ represents the result obtained after processing $x_{tijk}$ by the instance normalization layer, and $\varepsilon_1$ is a very small positive number to avoid a denominator of 0.

The convolution layer is the core layer of the CNN. In the convolution layer of the CNN, one neuron is only connected to some neurons of an adjacent layer. The convolution layer can apply a number of convolution kernels (also referred to as filters) to an input image, so as to extract multiple types of features of the input image. Each convolution kernel can extract one type of feature. Convolution kernels are generally initialized in the form of a random fractional matrix. During the training process of the CNN, the convolution kernels will obtain reasonable weights through learning. The result obtained by applying a convolution kernel to the input image is called a feature image, and the number of feature images is equal to the number of convolution kernels. The feature image outputted by the convolution layer of one stage can be inputted to the adjacent convolution layer of next stage and to be processed again to obtain a new feature image. For instance, as shown in FIG. 2A, the convolution layer of the first stage can output a first feature image, which is inputted to the convolution layer of the second stage and is processed again to obtain a second feature image.

For instance, as shown in FIG. 2B, the convolution layer can perform convolution on data of a certain local perception field of the input image by using different convolution kernels; the convolution result is inputted to the activation layer, and the activation layer performs computing according to a corresponding activation function, so as to obtain feature information of the input image.

For instance, as shown in FIGS. 2A-2B, the down-sampling layer is disposed between adjacent convolution layers, and the down-sampling layer is one form of down-sampling. On one hand, the down-sampling layer can be used to reduce the size of the input image, simplify the computing complexity, and reduce the over-fitting phenomenon to a certain extent. On the other hand, the down-sampling layer can also perform feature compression to extract main features of the input image. The down-sampling layer can reduce the size of the feature image, but does not change the number of feature images. For instance, if an input image with a size of 12×12 is sampled by a 6×6 convolution kernel, a 2×2 output image can be obtained, which means that 36 pixels on the input image are combined into 1 pixel in the output image. The final down-sampling layer or convolution layer can be connected to one or more fully connected layers, and the fully connected layer is used for connecting all the extracted features. The output of the fully connected layer can be a one-dimensional matrix, namely a vector.

Figure 3:
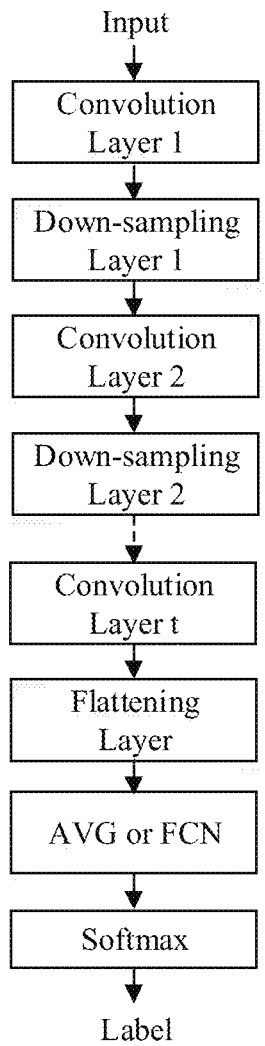
FIG. 3 is a schematic structural diagram of another convolutional neural network.

FIG. 3 is a schematic structural diagram of another CNN. For instance, in an example as shown in FIG. 3, the output of the final convolution layer (namely the convolution layer t) is inputted to a flattening layer to be flattened. The flattening layer can convert a feature image (2D image) into a vector (1D). The flattening operation can be performed in the following manner:

$$v_k = f_{k/j,k\%j}$$

where v is a vector including k elements, and f is a matrix with i rows and j columns.

Then, the output (namely 1D vector) of the flattening layer is inputted to a fully connected layer (FCN). The fully connected layer can have the same structure as the CNN, but the difference is that the fully connected layer uses different scalar values instead of convolution kernels.

For instance, the output of the final convolution layer can also be inputted to an averaging layer (AVG). The averaging layer is configured to average the output, namely utilizing the mean of the feature images to represent the output image. Thus, a 2D feature image is converted into a scalar. For instance, if including the averaging layer, the convolution neural network may not include the flattening layer.

For instance, according to actual demands, the averaging layer or the fully connected layer can be connected to a classifier, and the classifier can perform classification according to extracted features. The output of the classifier can be taken as the final output of the CNN, namely the label that denotes the image category.

For instance, the classifier can be a support vector machine (SVM) classifier, a softmax classifier, a K-Nearest Neighbor (KNN) classifier, etc. As shown in FIG. 3, in an example, the CNN includes a softmax classifier. The softmax classifier is a generator of logic functions that compresses a K-dimensional vector z containing any real number into a K-dimensional vector σ(z). A formula of the softmax classifier is as follows:

$$\sigma(z)_j = \frac{e^{z_j}}{\sum_{k=1}^{K} e^{z_k}}, j = 1, 2, \ldots, k.$$

where $Z_j$ represents the j-th element in the K-dimensional vector z; σ(z) denotes the prediction probability of each label; $\sigma(z)_j$ is a real number within the range of (0, 1); and the sum of the K-dimensional vector σ(z) is 1. According to the above formula, each label in the K-dimensional vector z is given a certain prediction probability, and the label having the largest prediction probability is selected as the identifier or category of the input image.

At least one embodiment of the present disclosure provides an image processing method. The image processing method includes obtaining an input image; and processing the input image by using a generative network to generate an output image, wherein the generative network includes a first sub-network and at least one second sub-network, and the processing the input image by using the generative network to generate the output image includes: processing the input image by using the first sub-network to obtain a plurality of first feature images; performing a branching process and a weight sharing process on the plurality of first feature images by using the at least one second sub-network to obtain a plurality of second feature images; and processing the plurality of second feature images to obtain the output image.

Some embodiments of the present disclosure further provide an image processing device, a training method of a neural network and a storage medium corresponding to the image processing method described above.

The image processing method provided by at least one embodiment of the present disclosure combines the branching process and the weight sharing process to perform an image enhancement process, which can not only reduce the number of parameters, but also facilitate the calculation of gradients during back propagation, thereby improving the processing speed and convergence speed while outputting a high-quality image.

Hereinafter, some embodiments of the present disclosure and examples thereof will be described in detail with reference to the accompanying drawings.

Figure 4:
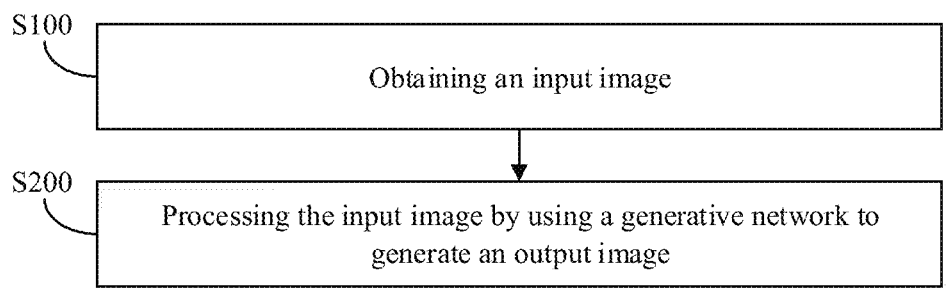
FIG. 4 is a flowchart of an image processing method provided by at least one embodiment of the present disclosure.

FIG. 4 is a flowchart of an image processing method provided by at least one embodiment of the present disclosure. For instance, as shown in FIG. 4, the image processing method includes steps S100 to S200.

Step S100: obtaining an input image.

For instance, in step S100, the input image can include a photo taken and acquired by a camera of a smart phone, a camera of a tablet computer, a camera of a personal computer, a lens of a digital camera, a surveillance camera or a network camera, etc., and the input image can include a person image, an animal/plant image or a landscape image, etc., without being limited in the embodiments of the present disclosure. For instance, the input image is a low-quality image, and the quality of the input image is lower than the quality of a photo taken, for example, by a digital single mirror reflex camera. For instance, the input image can be an RGB image including 3 channels, and the embodiments of the present disclosure include but are not limited to this case.

Step S200: processing the input image by using a generative network to generate an output image.

For instance, in step S200, the generative network can perform an image enhancement process on the input image, so that the output image is a high-quality image, and for instance, the quality of the output image is similar to the quality of a photo taken by a digital single mirror reflex camera.

Figure 5:
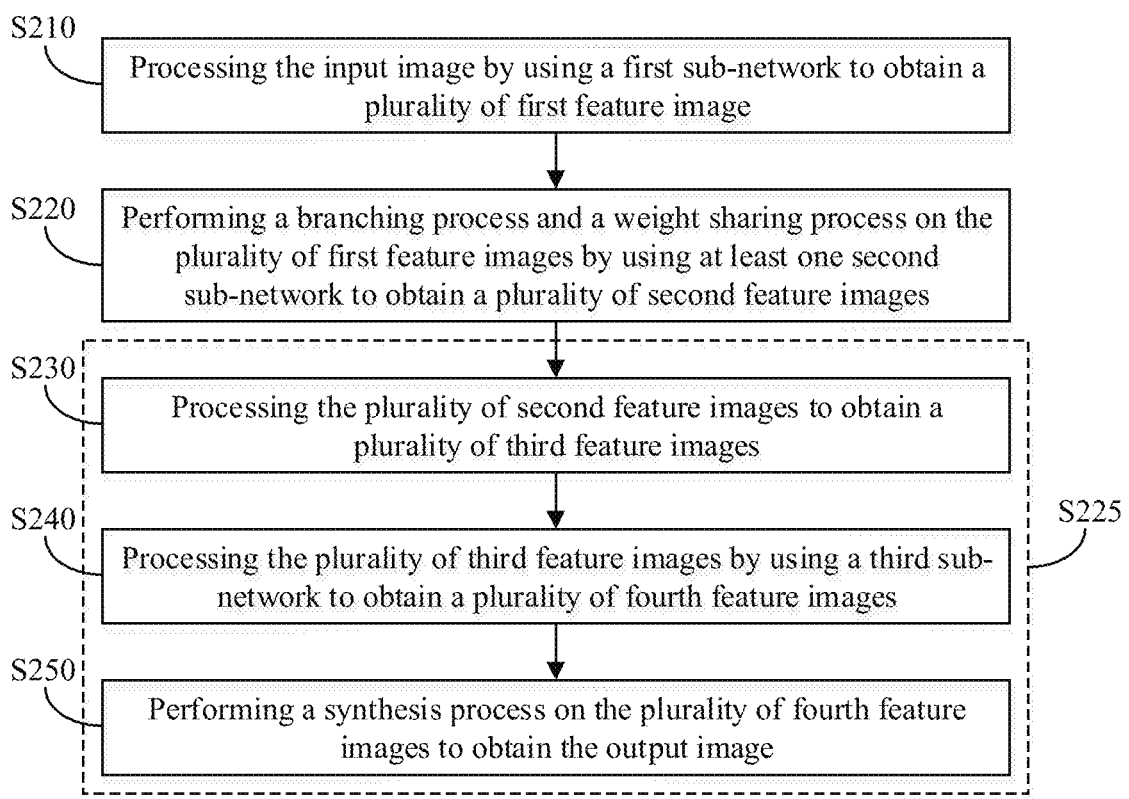
FIG. 5 is an exemplary flowchart corresponding to step S200 shown in FIG. 4.
Figure 6A:
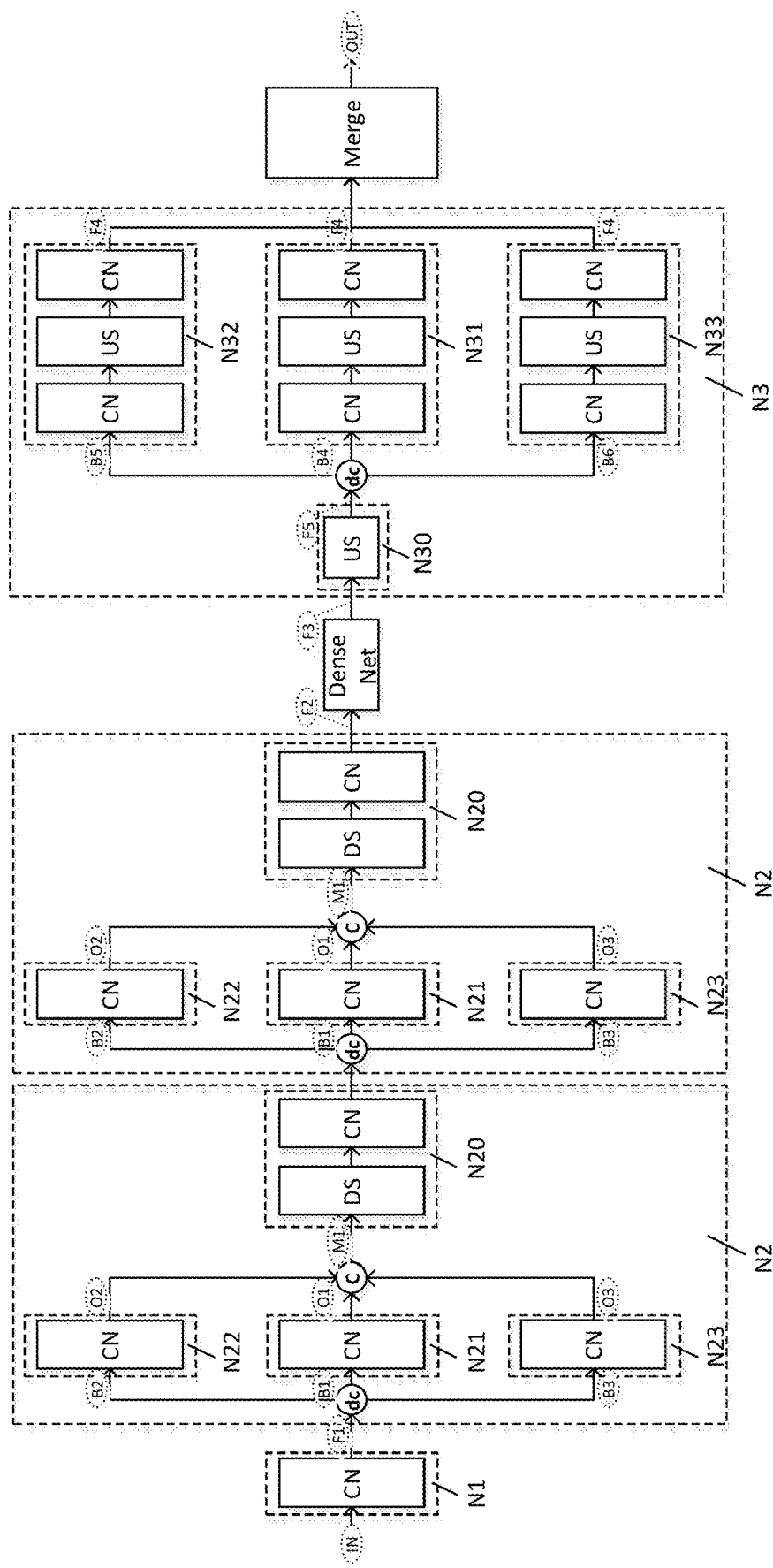
FIG. 6A is a schematic block diagram of an architecture of a generative network corresponding to the image processing method shown in FIG. 4 provided by at least one embodiment of the present disclosure.
Figure 6B:
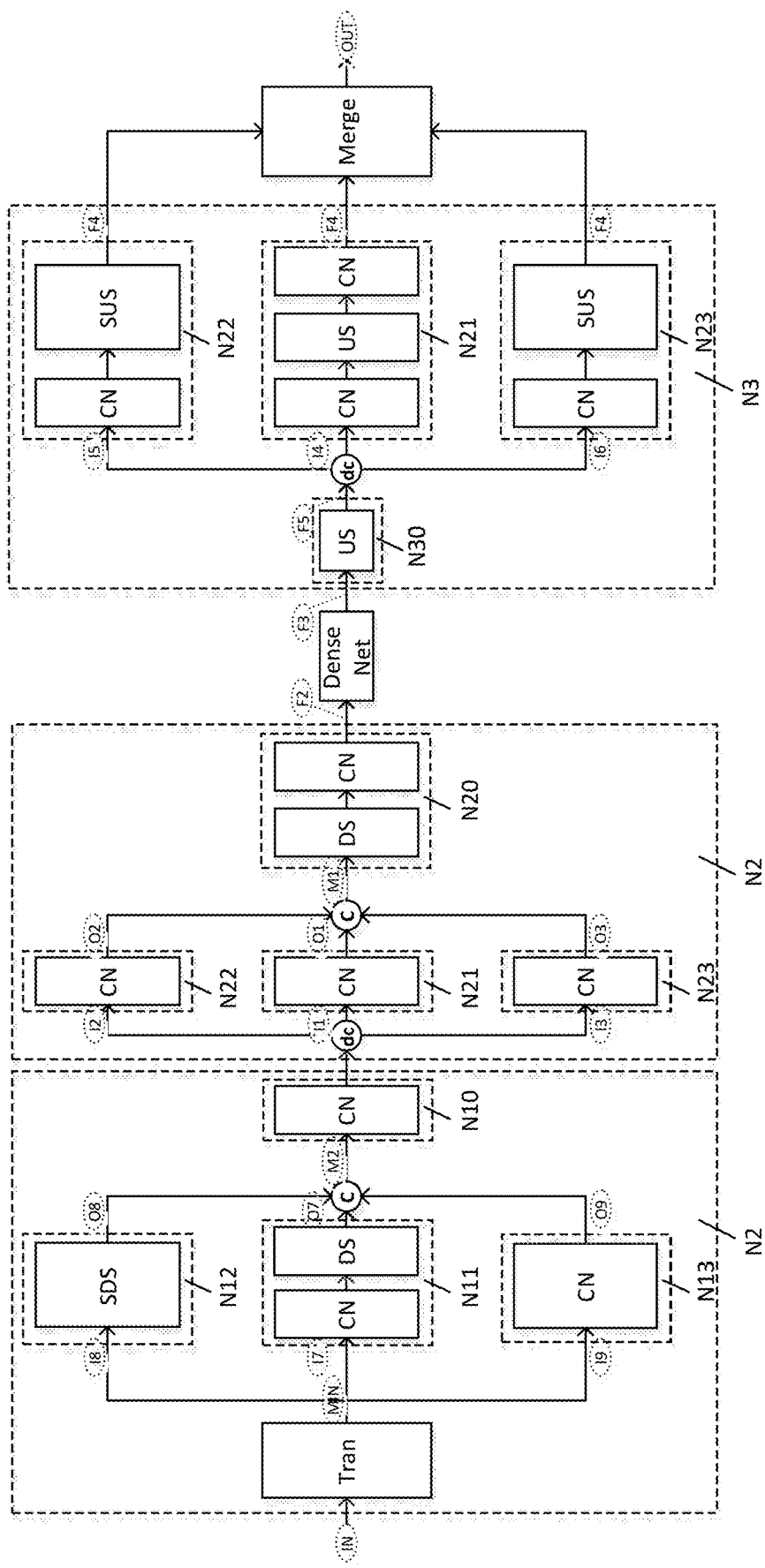
FIG. 6B is a schematic block diagram of an architecture of another generative network corresponding to the image processing method shown in FIG. 4 provided by at least one embodiment of the present disclosure.

FIG. 5 is an exemplary flowchart corresponding to step S200 shown in FIG. 4, FIG. 6A is a schematic block diagram of an architecture of a generative network corresponding to the image processing method shown in FIG. 4 provided by at least one embodiment of the present disclosure, and FIG. 6B is a schematic block diagram of an architecture of another generative network corresponding to the image processing method shown in FIG. 4 provided by at least one embodiment of the present disclosure.

Step S200 shown in FIG. 5 will be described below in detail with reference to the generative network shown in FIG. 6A.

For instance, as shown in FIG. 5, the processing the input image by using the generative network to generate the output image, i.e., step S200, includes steps S210, S220 and S225.

Step S210: processing the input image by using a first sub-network to obtain a plurality of first feature image.

For instance, in some examples, as shown in FIG. 6A, the generative network may include a first sub-network N1. For instance, as shown in FIG. 6A, the first sub-network N1 can include a convolution module CN, that is, the process of the first sub-network N1 includes a standard convolution process, so that step S210 can include performing a standard convolution process on the input image by using the first sub-network N1 to obtain the plurality of first feature images F1. It should be noted that, in the embodiments of the present disclosure, the convolution module CN can include a convolution layer and an instance normalization layer, and thus, the standard convolution process can include a convolution process and an instance normalization process, which are similar in the following and will not be repeated.

Step S220: performing a branching process and a weight sharing process on the plurality of first feature images by using at least one second sub-network to obtain a plurality of second feature images.

For instance, in some examples, as shown in FIG. 6A, the generative network can include at least one second sub-network N2. For instance, as shown in FIG. 6A, in some embodiments, the generative network can include two second sub-networks N2, namely a first-sequence second sub-network N2 and a second-sequence second sub-network N2 (it should be noted that in FIG. 6A, the second sub-network N2 close to the first sub-network N1 is the first-sequence second sub-network). Therefore, two second sub-networks N2 can be used to process the plurality of first feature images F1. For instance, as shown in FIG. 6A, the plurality of first feature images F1 can be taken as an input of the first-sequence second sub-network N2, and an output of the first-sequence second sub-network N2 can serve as the input of the second-sequence second sub-network N2.

It should be noted that, in the present disclosure, "connecting" two sub-networks can mean that an output of the former one of the two sub-networks is taken as an input of the latter one of the two sub-networks in a direction of signal transmission. For instance, "the first-sequence second sub-network N2 is connected to the first sub-network N1" can mean that the output of the first sub-network N1 is taken as the input of the first-sequence second sub-network N2.

For instance, in some examples, as shown in FIG. 6A, each second sub-network N2 can include a first branch network N21, a second branch network N22 and a third branch network N23, so that the branching process of each second sub-network N2 can include: dividing the input of each second sub-network (as shown by dc in each second sub-network N2 in FIG. 6A) into a first branch input B1, a second branch input B2 and a third branch input B3; and processing the first branch input B1 by using the first branch network N21 to obtain a first branch output O1, processing the second branch input B2 by using the second branch network N22 to obtain a second branch output O2, and processing the third branch input B3 by using the third branch network N23 to obtain a third branch output O3.

For instance, in some embodiments of the present disclosure, the number of feature images included in inputs of respective branch networks corresponding to each other can be the same. For instance, the number of feature images included in the first branch input B1, the number of feature images included in the second branch input B2 and the number of feature images included in the third branch input B3 are all the same. It should be noted that the embodiments of the present disclosure are not limited to this case. For instance, in some other embodiments of the present disclosure, the number of feature images included in the inputs of the respective branch networks corresponding to each other can be different from each other or not completely the same. For instance, the number of feature images included in the second branch input B2 and the number of feature images included in the third branch input B3 are the same, but are different from the number of feature images included in the first branch input B1. It should be understood that the branch networks corresponding to each other refer to branch networks at the same stage. For instance, the first branch network N21, the second branch network N22 and the third branch network N23 are a group of branch networks corresponding to each other; a fourth branch network N31, a fifth branch network N32 and a sixth branch network N33 which will be described below are a group of branch networks corresponding to each other; and a seventh branch network N11, an eighth branch network N12 and a ninth branch network N33 which will be described below are a group of branch networks corresponding to each other. Therefore, the requirements for the number of feature images included in the inputs of the fourth branch network N31, the fifth branch network N32 and the sixth branch network N33, and the requirements for the number of feature images included in the inputs of the seventh branch network N11, the eighth branch network N12 and the ninth branch network N13, can refer to the requirements for the number of feature images included in the inputs of the first branch network N21, the second branch network N22 and the third branch network N23, which will not be repeated in the following.

For instance, the input of each second sub-network N2 can include 3n feature images, where n is a positive integer, so that the first to n-th feature images can be divided into the first branch input B1, the (n+1)-th to (2n)-th feature images can be divided into the second branch input B2, and the (2n+1)-th to (3n)-th feature images can be divided into the third branch input B3. Alternatively, the first, fourth, seventh, . . . , (3n−2)-th feature images can be divided into the first branch input B1, the second, fifth, eighth, . . . , (3n−1)-th feature images can be divided into the second branch input B2, and the third, sixth, ninth, . . . , (3n)-th feature images can be divided into the third branch input B3. It should be noted that the specific division manners are not limited in the embodiments of the present disclosure.

For instance, as shown in FIG. 6A, each of the first branch network N21, the second branch network N22 and the third branch network N23 can include a convolution module CN, so that the first branch input B1, the second branch input B2 and the third branch input B3 can be respectively subjected to a standard convolution process to obtain a first branch output O1, a second branch output O2 and a third branch output O3, correspondingly. For instance, in some examples, the times of standard convolution processes of the first branch network N21, the times of standard convolution processes of the second branch network N22 and the times of standard convolution processes of the third branch network N23 can be the same; and of course, the parameters of the standard convolution process of the first branch network N21, the parameters of the standard convolution process of the second branch network N22 and the parameters of the standard convolution process of the third branch network N23 can be different from each other. It should be noted that the embodiments of the present disclosure are not limited to this case.

For instance, in some examples, as shown in FIG. 6A, each second sub-network N2 can further include a first backbone network N20, so that the weight sharing process of each second sub-network N2 can include: concatenating (as shown by c in each second sub-network in FIG. 6A) the first branch output O1, the second branch output O2 and the third branch output O3 to obtain a first intermediate output M1; and processing the first intermediate output M1 by using the first backbone network N20 to obtain an output of each second sub-network.

For instance, the embodiments can be described by taking a case that the feature images included in the first branch output O1, the second branch output O2 and the third branch output O3 are all a matrix having H rows and W columns as an example. The number of feature images included in the first branch output O1 is C1, the number of feature images included in the second branch output O2 is C2, and the number of feature images included in the third branch output O3 is C3, so models of the first branch output O1, the second branch output O2 and the third branch output O3 are (C1, H, W), (C2, H, W) and (C3, H, W), respectively. Therefore, by concatenating the first branch output O1, the second branch output O2 and the third branch output O3, the model of the first intermediate output M1 is (C1+C2+C3, H, W). The number of feature images included in the first intermediate output M1 is C1+C2+C3, and the arrangement order of respective feature images in the model of the first intermediate output M1 is not limited in the present disclosure. It should be noted that the present disclosure includes but is not limited to this case.

For instance, as shown in FIG. 6A, the first backbone network N20 can include a convolution module CN and a down-sampling layer DS, so that the first intermediate output M1 can be subjected to a standard convolution process and a down-sampling processing. It should be noted that the sequence of the convolution module CN and the down-sampling layer DS in the first backbone network N20 (that is, the sequence of the standard convolution process and the down-sampling process) is not limited in the embodiments of the present disclosure.

The down-sampling process is used to reduce the size of the feature image, thereby reducing the data amount of the feature image. For instance, the down-sampling process can be performed through the down-sampling layer, but the embodiments of the present disclosure are not limited to this case. For instance, the down-sampling layer can adopt any one down-sampling method, such as max pooling, average pooling, strided convolution, decimation (e.g., selecting fixed pixels), demuxout (e.g., splitting the input image into a plurality of smaller images), etc.

It should be noted that in the case where the number of second sub-networks N2 in the at least one second sub-network N2 is greater than or equal to 2, the methods and parameters of the down-sampling processes in first backbone networks N20 of different second sub-networks N2 can be the same or different, without being limited in the embodiments of the present disclosure.

It should be noted that the number of second sub-networks N2 in FIG. 6A is 2, which is illustrative, the number of second sub-networks N2 is not specifically limited in the embodiments of the present disclosure. For instance, the number of second sub-networks N2 can also be 1, 3, etc. For example, the at least one second sub-network can include a first-sequence second sub-network, the first-sequence second sub-network is connected to the first sub-network N1, and the plurality of first feature images F1 serve as the input of the first-sequence second sub-network; For another example, the at least one second sub-network can include other second sub-networks besides the first-sequence second sub-network, and each of the other second sub-networks takes the output of a previous second sub-network connected thereto as the input of the each of the other second sub-networks, and the output of the last second sub-network is the plurality of second feature images F2.

Step S225: processing the plurality of second feature images to obtain the output image.

For instance, specifically, as shown in FIG. 5, step S225 can include steps S230 to S250.

Step S230: processing the plurality of second feature images to obtain a plurality of third feature images.

For instance, in some examples, as shown in FIG. 6A, the generative network can further include a dense sub-network DenseNet. For instance, as shown in FIG. 6A, in step S250, the plurality of second feature images F2 can be processed by using the dense sub-network DenseNet to obtain the plurality of third feature images F3.

Figure 7:
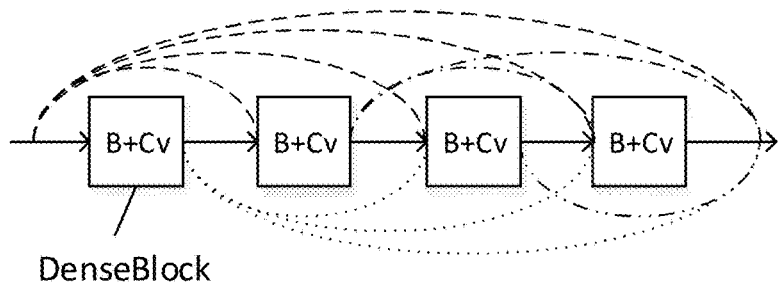
FIG. 7 is a schematic structural diagram of a dense sub-network provided by at least one embodiment of the present disclosure.

FIG. 7 is a schematic structural diagram of a dense sub-network provided by at least one embodiment of the present disclosure. For instance, as shown in FIG. 7, the dense sub-network DenseNet includes a plurality of dense modules DenseBlock, and for instance, the number of dense modules DenseBlock is N, where N≥2. It should be noted that the number N, which is equal to 4, of dense modules DenseBlock in the dense sub-network DenseNet shown in FIG. 7 is illustrative, and should not be regarded as a limitation of the present disclosure.

For instance, in some examples, as shown in FIG. 6A and FIG. 7, the plurality of second feature images F2 can serve as the input of the first dense module in the N dense modules DenseBlock (for instance, the first dense module is connected to the last second sub-network N2 in the at least one second sub-network N2), the plurality of second feature images F2 are concatenated with outputs of i−1 dense modules which are before the i-th dense module in the N dense modules DenseBlock, to serve as the input of the i-th dense module, and the plurality of second feature images are concatenated with the output of each dense module to serve as the plurality of third feature images F3, where i is an integer, i≥2 and I≤N. It should be noted that the present disclosure includes but is not limited to this case. For instance, in some other examples, it may be that only outputs of respective dense modules are concatenated to serve as the plurality of third feature images F3. For instance, the concatenating operation here can refer to the concatenating operation in the second sub-network described above, and details will not be repeated here. For instance, in some examples, as shown in FIG. 7, each dense module DenseBlock can include a bottleneck layer B and a convolution layer Cv, so that the process of each dense module DenseBlock includes a dimension reduction process and a convolution process. For instance, the bottleneck layer B can adopt 1×1 convolution kernels to reduce the dimension of data and reduce the number of feature images, thus reducing the number of parameters in subsequent convolution process, reducing the amount of computation, and further improving the processing speed.

For instance, the dense sub-network DenseNet has many advantages, such as greatly reducing parameters, reducing the amount of computation, effectively solving the problem of vanishing gradient, supporting feature reuse and strengthening feature propagation, and having very good anti over-fitting performance.

Step S240: processing the plurality of third feature images by using a third sub-network to obtain a plurality of fourth feature images.

For instance, in some examples, as shown in FIG. 6A, the generative network can further include a third sub-network N3. For instance, as shown in FIG. 6A, the third sub-network N3 can include a second backbone network N30, a fourth branch network N31, a fifth branch network N32, and a sixth branch network N33, so that the process of the third sub-network N3 can include: processing the plurality of third feature images F3 by using the second backbone network N30 to obtain a plurality of fifth feature images F5; dividing the plurality of fifth feature images F5 into a fourth branch input B4, a fifth branch input B5 and a sixth branch input B6; and processing the fourth branch input B4 by using the fourth branch network N31 to obtain a fourth feature image F4 corresponding to the fourth branch network N31, processing the fifth branch input B5 by using the fifth branch network N32 to obtain a fourth feature image F4 corresponding to the fifth branch network N32, and processing the sixth branch input B6 by using the sixth branch network N33 to obtain a fourth feature image F4 corresponding to the sixth branch network N33.

For instance, the plurality of fourth feature images F4 obtained in step S240 include the fourth feature image corresponding to the fourth branch network N31, the fourth feature image corresponding to the fifth branch network N32 and the fourth feature image corresponding to the sixth branch network N33.

For instance, in some examples, as shown in FIG. 6A, the second backbone network N30 can include an up-sampling layer US, so that the plurality of input third feature images F3 can be up-sampled to obtain the plurality of fifth feature images F5.

The up-sampling process is used to increase the size of the feature image, thereby increasing the data amount of the feature image. For instance, the up-sampling process can be performed through the up-sampling layer, but the embodiments of the present disclosure are not limited to this case. For instance, the up-sampling layer can adopt any one up-sampling method, such as strided transposed convolution and interpolation algorithms, etc., to realize the up-sampling process. For instance, the interpolation algorithms can include interpolation, bilinear interpolation, bicubic interpolation and other algorithms.

It should be noted that the interpolation algorithm can be used not only for up-sampling but also for down-sampling. For instance, in the case where the interpolation algorithm is used for an up-sampling process, the original pixel values and interpolated values can be retained, thereby increasing the size of the feature image; and for instance, in the case where the interpolation algorithm is used for a down-sampling process, only the interpolated value (removing the original pixel values) may be retained, thereby reducing the size of the feature image.

Figure 8A:
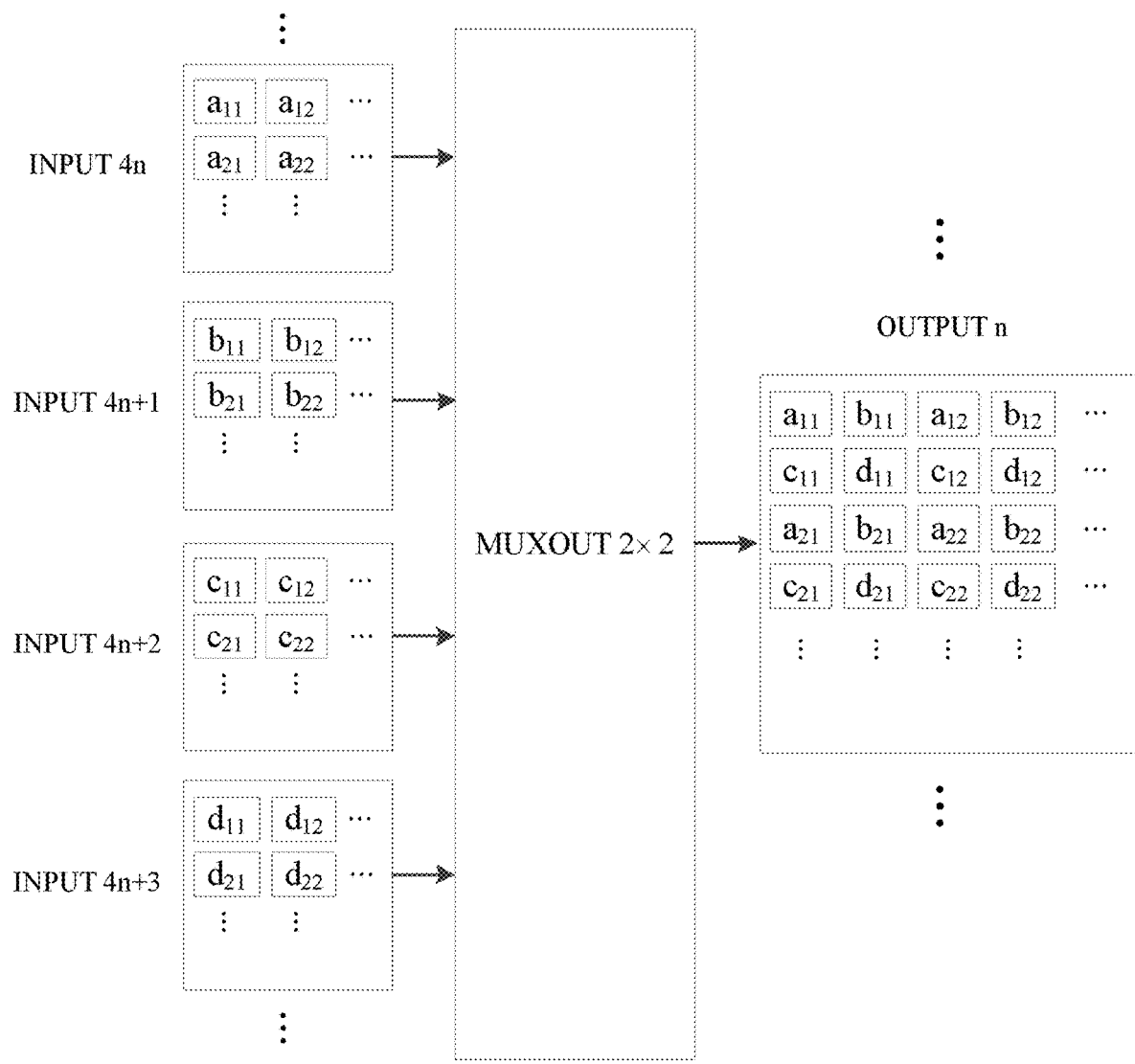
FIG. 8A is a schematic diagram of an up-sampling layer provided by at least one embodiment of the present disclosure.
Figure 8B:
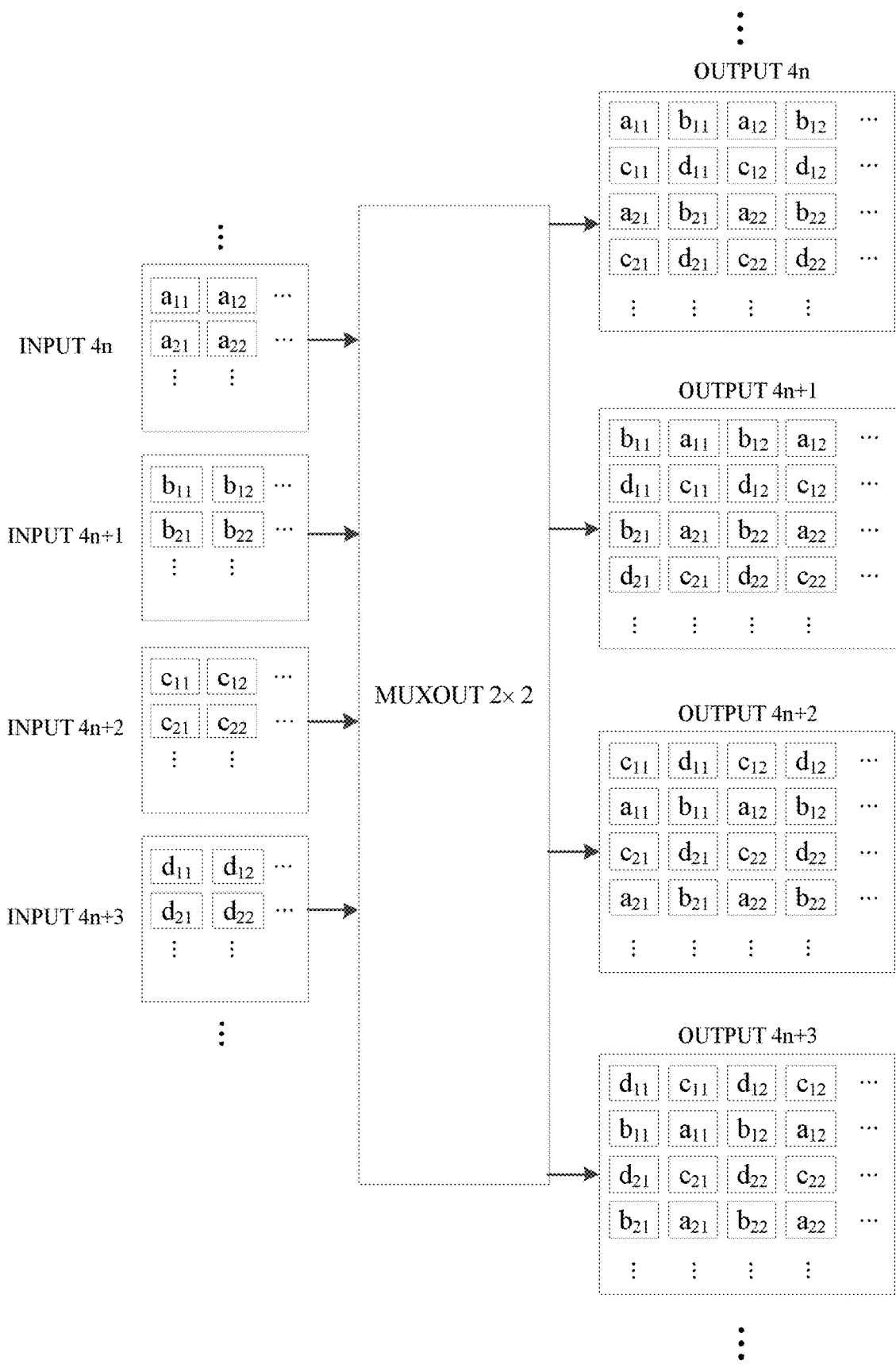
FIG. 8B is a schematic diagram of another up-sampling layer provided by at least one embodiment of the present disclosure.

FIG. 8A is a schematic diagram of an up-sampling layer provided by at least one embodiment of the present disclosure, and FIG. 8B is a schematic diagram of another up-sampling layer provided by at least one embodiment of the present disclosure.

For instance, in some examples, as shown in FIG. 8A, the up-sampling layer adopts a pixel interpolation method to realize the up-sampling process. In this case, the up-sampling layer can also be referred to as a composite layer. The composite layer adopts an up-sampling factor of 2×2, so that four input feature images (i.e., INPUT 4n, INPUT 4n+1, INPUT 4n+2, INPUT 4n+3 shown in FIG. 8A) can be combined to obtain an output feature image with a fixed pixel order (i.e., OUTPUT n shown in FIG. 8A).

For instance, in some examples, for two-dimensional feature images, the up-sampling layer acquires a first number of input feature images, and interleave and rearrange the pixel values of these input feature images to generate the same first number of output feature images. Compared with the input feature images, the number of output feature images does not change with respect to the number of the input feature images, but the size of each output feature image increases by a corresponding multiple with respect to the size of each input feature image. Therefore, the composite layer adds more data information through different permutations and combinations, which can provide all possible up-sampling combinations. Finally, the up-sampling combinations can be selected by an activation layer.

For instance, in the example shown in FIG. 8B, the up-sampling layer adopts the pixel value interleaving rearrangement method to realize up-sampling. In this case, the up-sampling layer can also be referred to as a composite layer. The composite layer also adopts an up-sampling factor of 2×2, that is, every four input feature images (i.e., INPUT 4n, INPUT 4n+1, INPUT 4n+2, INPUT 4n+3 shown in FIG. 8B) are taken as a group, and their pixel values are interleaved to generate four output feature images (that is, OUTPUT 4n, OUTPUT 4n+1, OUTPUT 4n+2, OUTPUT 4n+3 shown in FIG. 8B). The number of input feature images is the same as that of output feature images obtained after the process of the composite layer, and the size of each output feature image is increased to 4 times that of each input feature images, that is, the number of pixels in each output feature image is 4 times the number of pixels in each input feature image.

For instance, in some examples, as shown in FIG. 6A, the fourth branch network N31, the fifth branch network N32, and the sixth branch network N33 can each include a convolution module CN, so that the fourth branch input B4, the fifth branch input B5, and the sixth branch input B6 can be subjected to a standard convolution process, respectively. For instance, in some examples, the times of standard convolution processes of the fourth branch network N31, the times of standard convolution processes of the fifth branch network N32, and the times of standard convolution processes of the sixth branch network N33 can be the same; and of course, the parameters of the standard convolution process of the fourth branch network N31, the parameters of the standard convolution process of the fifth branch network N32 and the parameters of the standard convolution process of the sixth branch network N33 can be different from each other. It should be noted that the embodiments of the present disclosure are not limited to this case.

For instance, in some examples, as shown in FIG. 6A, the fourth branch network N31, the fifth branch network N32, and the sixth branch network N33 can each include an up-sampling layer US, so that the process of the fourth branch network N31, the process of the fifth branch network N32, and the process of the sixth branch network N33 can each further include an up-sampling process. For instance, in some examples, the number of up-sampling processes of the fourth branch network N31, the number of up-sampling processes of the fifth branch network N32 and the number of up-sampling processes of the sixth branch network N33 can be the same; and of course, the parameters of the up-sampling process of the fourth branch network N31, the parameters of the up-sampling process of the fifth branch network N32 and the parameters of the up-sampling process of the sixth branch network N33 can be different from each other. It should be noted that the embodiments of the present disclosure are not limited to this case.

It should be noted that the method of the up-sampling process in the second backbone network N30 can be the same as or different from the methods of the up-sampling processes in the fourth branch network N31, the fifth branch network N32 and the sixth branch network N33, without being limited in the embodiments of the present disclosure.

For instance, in some examples, the number of fourth feature images F4 corresponding to the fourth branch network N31 is 1, the number of fourth feature images F4 corresponding to the fifth branch network N32 is 1, and the number of fourth feature images F4 corresponding to the sixth branch network N33 is 1, that is, the plurality of feature images F4 include 3 feature images.

Step S250: performing a synthesis process on the plurality of fourth feature images to obtain the output image.

For instance, in some examples, as shown in FIG. 6A, the generative network can further include a synthesis module Merg. For instance, as shown in FIG. 6A, in step S250, the plurality of fourth feature images F4 can be processed by using the synthesis module Merg to obtain the output image OUT.

For instance, in some examples, the synthesis module Merg can include a first conversion matrix, and the first conversion matrix is configured for converting the plurality of fourth feature images F4 into an output image OUT. For instance, in some examples, specifically, processing the plurality of fourth feature images F4 by using the synthesis module Merg to obtain the output image OUT can include: converting, by using the first conversion matrix, data information of the fourth feature image F4 corresponding to the fourth branch network N31, data information of the fourth feature image F4 corresponding to the fifth branch network N32 and data information of the fourth feature image F4 corresponding to the sixth branch network N33 into data information of a first color channel, data information of a second color channel and data information of a third color channel of the output image, so as to obtain the output image OUT.

For instance, in some examples, the first color channel, the second color channel and the third color channel can be a red (R) channel, a green (G) channel and a blue (B) channel, respectively, so that the output image OUT is an image in RGB format. It should be noted that embodiments of the present disclosure include but are not limited to this case.

For instance, in some examples, the first conversion matrix can be used to convert an image in YUV format into an image in RGB format. For instance, the conversion formula of the first conversion matrix can be expressed as:

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \cdot \begin{bmatrix} Y \\ U \\ V \end{bmatrix},$$

where Y, U and V respectively represent luminance information (i.e., data information of a first luminance channel), first chromaticity information (i.e., data information of a first color difference channel) and second chromaticity information (i.e., data information of a second color difference channel) of the image in YUV format, and R, G and B respectively represent red information (i.e., data information of the first color channel), green information (i.e., data information of the second color channel) and blue information (i.e., data information of the third color channel) of the image in RGB format, which is obtained by the conversion operation.

It should be noted that before using, for example, the generative network shown in FIG. 6A, to execute the image processing method provided by the embodiment of the present disclosure, the generative network can be trained first. For instance, in the training process, parameters of the first conversion matrix are fixed. For instance, after the generative network shown in FIG. 6A is trained, the data information of the fourth feature image F4 output by the fourth branch network N31, the data information of the fourth feature image F4 output by the fifth branch network N32 and the data information of the fourth feature image F4 output by the sixth branch network N33 correspond to the data information of the first luminance channel, the data information of the first color difference channel and the data information of the second color difference channel, respectively, so that the output image OUT in RGB format can be obtained after being converted by the first conversion matrix.

For instance, the output image OUT retains the content of the input image IN, but the output image OUT is a high-quality image. For instance, the quality of the output image OUT can be similar to the quality of a photo taken by a digital single mirror reflex camera.

For instance, in some examples, the number of the fourth feature image F4 output by the fourth branch network N31, the number of the fourth feature image F4 output by the fifth branch network N32 and the number of the fourth feature image F4 output by the sixth branch network N33 are all 1, that is, the plurality of feature images F4 include three feature images (corresponding to the first luminance channel, the first color difference channel and the second color difference channel, respectively), and the first conversion matrix can convert the three feature images into the output image OUT in RGB format.

For instance, because the fourth branch network N31, the fifth branch network N32, and the sixth branch network N33 all include a standard convolution process (the standard convolution process includes a convolution process and an instance normalization process), the range of grayscale values of pixels of the plurality of fourth feature images F4 may be, for instance, [−1,1]. Therefore, the process of the synthesis module Merg can further include converting the range of grayscale values of pixels of the output image OUT into, for instance, [0,255].

In terms of YUV format, Y stands for luminance, U and V stand for chromaticity, and U and V are two components of color. In YUV color space, the first luminance channel (Y channel) is separated from the first color difference channel (U channel) and the second color difference channel (V channel). For instance, YUV format can include YUV444, YUV420, YUV422, etc. The main differences of the formats YUV444, YUV420 and YUV422 lie in the sampling methods and storage methods for data of U channel and V channel.

For instance, YUV444 format indicates that two kinds of chromaticity information (i.e., the first chromaticity information U and the second chromaticity information V) are complete in each row of pixels, that is, both kinds of chromaticity information are stored based on complete sampling.

Assume that four pixels in an image are expressed as:
[Y0U0V0][Y1U1V1][Y2U2V2][Y3U3V3].

In the process of image processing, the data stream for storing or processing the four pixels is as follows:
Y0U0V0Y1U1V1Y2U2V2 Y3U3V3.

The mapped pixels are respectively expressed as:
[Y0U0V0][Y1U1V1][Y2U2V2][Y3U3V3].

That is, the mapped pixels are original pixels.

For instance, YUV420 format indicates that there is only one kind of chromaticity information (the first chromaticity information U or the second chromaticity information V) in each row of pixels, and the first chromaticity information U or the second chromaticity information V is sampled and stored at a frequency of ½. In the process of image processing, adjacent rows process different chromaticity information.

Assume that eight pixels in two rows in an image are respectively expressed as:
[Y0U0V0] [Y1U1V1] [Y2U2V2] [Y3U3V3],
[Y4U4V4] [Y5U5V5] [Y6U6V6] [Y7U7V7].

In the process of image processing, the data stream for storing or processing these 8 pixels is as follows:
Y0U0 Y1 Y2U2 Y3,
Y4V4 Y5 Y6V6 Y7.

In the first row of pixels, there is only the first chromaticity information U; and in the second row of pixels, there is only the second chromaticity information V.

The mapped pixels are expressed as:
[Y0 U0 V4] [Y1 U0 V4] [Y2 U2 V6] [Y3 U2 V6],
[Y4 U0 V4] [Y5 U0 V4] [Y6 U2 V7] [Y7 U2 V6].

To sum up, the adjacent four pixels in each row only occupy 6 bytes upon being stored or processed. Compared with YUV444 (4 pixels need 12 bytes) sampling format, YUV420 format reduces the data amount of processed and stored pixels. Although the mapped pixels are slightly different from the original pixels, these differences will not cause obvious changes in the perception of human eyes.

For instance, in some examples, in the generative network shown in FIG. 6A, the plurality of feature images F4 can have the image format of YUV444. It should be noted that embodiments of the present disclosure include but are not limited to this case.

The generative network shown in FIG. 6B differs from the generative network shown in FIG. 6A mainly in the first sub-network N1 and the third sub-network N3. It should be noted that other structures of the generative network shown in FIG. 6B are basically the same as those of the generative network shown in FIG. 6A, so details of these structures will not be repeated here.

With reference to the differences between the generative network shown in FIG. 6B and the generative network shown in FIG. 6A, the steps in the flow shown in FIG. 5 corresponding to these differences will be described in detail below.

For instance, in some examples, the input image has a first color channel, a second color channel and a third color channel. For instance, the first color channel, the second color channel and the third color channel can be a red (R) channel, a green (G) channel and a blue (B) channel, respectively, and the embodiments of the present disclosure include but are not limited to this case. For instance, accordingly, in the generative network shown in FIG. 6B, the first sub-network N1 can include a conversion module Tran, a seventh branch network N11, an eighth branch network N12, a ninth branch network N13 and a third backbone network N10, so that step S210 can include the following steps S211 to S214.

Step S211: converting, by using the conversion module Tran, data information of the first color channel, the second color channel and the third color channel of the input image IN into data information of a first luminance channel, a first color difference channel and a second color difference channel of an intermediate input image MIN.

For instance, in some examples, the conversion module Tran can include a second conversion matrix, and the second conversion matrix is configured for converting the input image IN into the intermediate input image MIN. For instance, in some examples, the second conversion matrix can be used to convert an image in RGB format into an image in YUV format. For instance, the conversion formula of the second conversion matrix can be expressed as:

$$\begin{cases} Y = 0.30R + 0.59G + 0.11B \\ U = 0.493 \cdot (0.70R - 0.59G - 0.11B) \\ V = 0.877 \cdot (-0.30R - 0.59G - 0.11B) \end{cases}$$

where R, G and B respectively represent red information (i.e, data information of the first color channel), green information (i.e, data information of the second color channel) and blue information (i.e, data information of the third color channel) of the image in RGB format, and Y, U and V respectively represent luminance information (i.e, data information of the first luminance channel), first chromaticity information (i.e, data information of the first color difference channel) and second chromaticity information (i.e, data information of the second color difference channel) of the image in YUV format, which is obtained by the conversion operation.

For instance, in some examples, the input image IN has RGB format, and the intermediate input image MIN has, for example, YUV420 format, thus reducing the size of U channel and V channel, and further reducing the number of convolution kernels in the generative network. It should be noted that the present embodiment includes but is not limited to this case.

Step S212: processing data information of the first luminance channel of the intermediate input image by using the seventh branch network to obtain a seventh branch output, processing data information of the first color difference channel of the intermediate input image by using the eighth branch network to obtain an eighth branch output, and processing data information of the second color difference channel of the intermediate input image by using the ninth branch network to obtain a ninth branch output.

For instance, in some examples, as shown in FIG. 6B, the data information of the first luminance channel, the first color difference channel and the second color difference channel of the intermediate input image MIN are taken as the seventh branch input B7, the eighth branch input B8 and the ninth branch input B9, respectively, and are processed via the seventh branch network N11, the eighth branch network N12 and the ninth branch network N13 respectively to obtain the seventh branch output O7, the eighth branch output O8 and the ninth branch output O9, correspondingly.

For instance, as shown in FIG. 6B, the seventh branch network N11 can include a convolution module CN and a down-sampling layer DS, so that the seventh branch input B7 can be subjected to a standard convolution process and a down-sampling process. The eighth branch network N12 and the ninth branch network N13 can each include a standard down-sampling layer SDS, so that the eighth branch input B8 and the ninth branch input B9 can be subjected to a standard down-sampling process, respectively.

For instance, the standard down-sampling layer can adopt an interpolation algorithm, such as interpolation, bilinear interpolation, bicubic interpolation, etc., for performing the standard down-sampling process. For instance, in the case where an interpolation algorithm is adopted for the standard down-sampling process, only the interpolated values (excluding the original pixel values) may be retained, thereby reducing the size of the feature image.

For instance, in some examples, the methods of the standard down-sampling processes in the eighth branch network N12 and the ninth branch network N13 can be the same, but parameters thereof can be different. It should be noted that the embodiments of the present disclosure include but are not limited to this case.

For instance, compared with the seventh branch network N11, it is equivalent to omitting the convolution module for processing the highest resolution of the U channel in the eighth branch network N12, and it is equivalent to omitting the convolution module for processing the highest resolution of the V channel in the ninth branch network N13, thus improving the processing speed.

Step S213: concatenating the seventh branch output, the eighth branch output and the ninth branch output to obtain a second intermediate output.

For instance, in some examples, as shown in FIG. 6B, referring to the concatenating manner in the second sub-network, the seventh branch output O7, the eighth branch output O8 and the ninth branch output O9 can be concatenated to obtain the second intermediate output M2, and specific details will not be repeated here.

Step S214: processing the second intermediate output by using the third backbone network to obtain the plurality of first feature images.

For instance, in some examples, as shown in FIG. 6B, the second intermediate output M2 can be processed by using the third backbone network N10 to obtain the plurality of first feature images F1. For instance, as shown in FIG. 6B, the third backbone network N10 can include a convolution module CN, so that the input second intermediate output M2 can be subjected to a standard convolution process to obtain the plurality of first feature images F1.

For instance, in the generative network shown in FIG. 6B, the at least one second sub-network N2 can be used to execute step S220, that is, to perform the branching process and the weight sharing process on the plurality of first feature images F1 to obtain the plurality of second feature images F2. For instance, the specific details can refer to the corresponding description of performing step S220 based on the generative network shown in FIG. 6A, which will not be repeated here. It should be noted that in the generative network shown in FIG. 6B, the number of the second sub-networks N2 is 1, which is illustrative and should not be regarded as a limitation of the present disclosure.

For instance, in the generative network shown in FIG. 6B, the dense sub-network DenseNet can be used to execute step S230, that is, to process the plurality of second feature images F2 to obtain the plurality of third feature images F3. For instance, the specific details can refer to the corresponding description of performing step S230 based on the generative network shown in FIG. 6A, and the details will not be repeated here.

For instance, in the generative network shown in FIG. 6B, the third sub-network N3 can be used to execute step S240, that is, to process the plurality of third feature images F3 by using the third sub-network N3 to obtain the plurality of fourth feature images F4. For instance, similar to the generative network shown in FIG. 6A, in the generative network shown in FIG. 6B, the third sub-network N3 can also include a second backbone network N30, a fourth branch network N31, a fifth branch network N32 and a sixth branch network N33, so that the process of the third sub-network N3 can also include: processing the plurality of third feature images F3 by using the second backbone network N30 to obtain a plurality of fifth feature images F5; dividing the plurality of fifth feature images F5 into a fourth branch input B4, a fifth branch input B5 and a sixth branch input B6; and processing the fourth branch input B4 by using the fourth branch network N31 to obtain a fourth feature image F4 corresponding to the fourth branch network N31, processing the fifth branch input B5 by using the fifth branch network N32 to obtain a fourth feature image F4 corresponding to the fifth branch network N32, and processing the sixth branch input B6 by using the sixth branch network N33 to obtain a fourth feature image F4 corresponding to the sixth branch network N33.

For instance, similar to the generative network shown in FIG. 6A, in the generative network shown in FIG. 6B, the second backbone network N30 can also include an up-sampling layer US, so that the plurality of third feature images F3 being inputted can be up-sampled to obtain the plurality of fifth feature images F5.

For instance, similar to the generative network shown in FIG. 6A, in the generative network shown in FIG. 6B, the fourth branch network N31 can also include a convolution module and an up-sampling layer for performing a standard convolution process and an up-sampling process. For instance, different from the generative network shown in FIG. 6B, in the generative network shown in FIG. 6B, both the fifth branch network N32 and the sixth branch network N33 can include a convolution module CN and a standard up-sampling layer SUS for performing a standard convolution process and a standard up-sampling processing.

For instance, the standard up-sampling layer can adopt an interpolation algorithm, such as interpolation, bilinear interpolation, bicubic interpolation, etc., for performing the standard up-sampling process. For instance, in the case where an interpolation algorithm is adopted for the standard up-sampling process, the original pixel values and interpolated values can be retained, thus increasing the size of the feature image.

For instance, compared with the fourth branch network N31, it is equivalent to omitting the convolution module for processing the highest resolution of the U channel in the fifth branch network N32, and it is equivalent to omitting the convolution module for processing the highest resolution of the V channel in the sixth branch network N33, thus improving the processing speed. This case is similar to the aforementioned case related to the seventh branch network N11, the eighth branch network N12, and the ninth branch network N13. It should be noted that the standard up-sampling layer SUS in the fifth branch network N32 generally corresponds to the standard down-sampling layer SDS in the eighth branch network N12, and the standard up-sampling layer SUS in the sixth branch network N33 generally corresponds to the standard down-sampling layer SDS in the ninth branch network N13. It should be noted that the embodiments of the present disclosure include but are not limited to this case.

For instance, in the generative network shown in FIG. 6B, the synthesis module Merg can be used to execute step S250, that is, to process the plurality of fourth feature images F4 by using the synthesis module Merg to obtain the output image OUT. For instance, the specific details can refer to the corresponding description of performing step S250 based on the generative network shown in FIG. 6A, which will not be repeated here.

It should be noted that in the embodiments of the present disclosure, the generative network shown in FIG. 6A and the generative network shown in FIG. 6B are only illustrative, not restrictive. It should also be noted that before training the generative network, the generative network may not have the function of image enhancement processing at all; or it may have the function of image enhancement processing, but the effect of image enhancement processing is not good; and the generative network obtained after training a generative network to be trained has the function of image enhancement processing and can generate high-quality images.

Figure 9A:
FIG. 9A is a schematic diagram of an input image.
Figure 9B:
FIG. 9B is a schematic diagram of an output image obtained by processing the input image shown in FIG. 9A via the generative network shown in FIG. 6A.
Figure 9C:
FIG. 9C is a schematic diagram of an output image obtained by processing the input image shown in FIG. 9A via the generative network shown in FIG. 6B.

FIG. 9A is a schematic diagram of an input image, FIG. 9B is a schematic diagram of an output image obtained by processing the input image shown in FIG. 9A via the generative network shown in FIG. 6A, and FIG. 9C is a schematic diagram of an output image obtained by processing the input image shown in FIG. 9A via the generative network shown in FIG. 6B. For instance, compared with the input image shown in FIG. 9A, the output images shown in FIG. 9B and FIG. 9C both retain the content of the input image, but improve the contrast of the image and alleviate the problem that the input image is too dark. Therefore, compared with the input image, the quality of the output image can be similar to the quality of a photo taken by a digital single mirror reflex camera, that is, the output image is a high-quality image. Therefore, the image processing method provided by the embodiments of the present disclosure achieves the effect of image enhancement processing.

The image processing method provided by the embodiments of the present disclosure can combine the branching process and the weight sharing process to perform an image enhancement process, which can not only reduce the number of parameters, but also facilitate the calculation of gradients during back propagation, thereby improving the processing speed and convergence speed while outputting a high-quality image.

Figure 10:
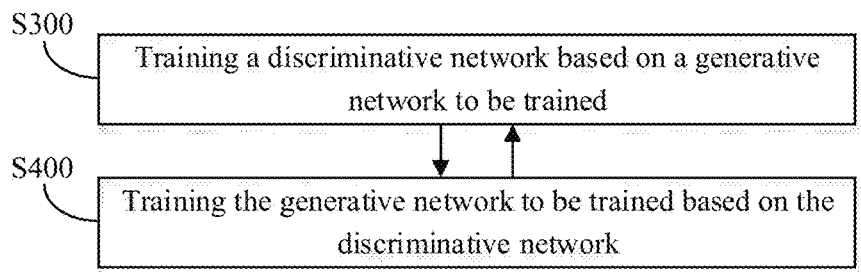
FIG. 10 is a flowchart of a training method of a neural network provided by at least one embodiment of the present disclosure.

At least one embodiment of the present disclosure further provides a training method of a neural network. FIG. 10 is a flowchart of a training method of a neural network provided by at least one embodiment of the present disclosure. For instance, as shown in FIG. 10, the training method includes:

step S300: training a discriminative network based on a generative network to be trained;

step S400: training the generative network to be trained based on the discriminative network; and alternately executing the above training processes to obtain the generative network in the image processing method provided by any one of the above embodiments of the present disclosure.

For instance, in some examples, the structure of the generative network to be trained can be the same as the structure of the generative network shown in FIG. 6A or the structure of the generative network shown in FIG. 6B, and the embodiments of the present disclosure include but are not limited to this case. For instance, the generative network to be trained, after being trained by using the training method, can execute the image processing method provided by any one of the above embodiments of the present disclosure, that is, the generative network obtained by the training method can execute the image processing method provided by any one of the above embodiments of the present disclosure.

Figure 11A:
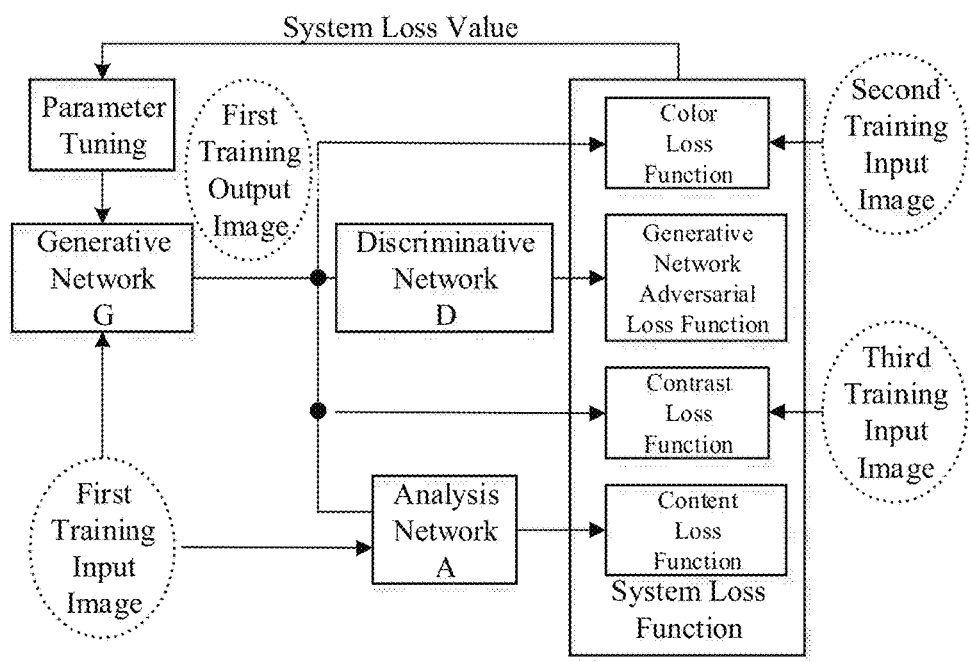
FIG. 11A is a schematic block diagram of an architecture of training a generative network to be trained corresponding to the training method shown in FIG. 10 provided by at least one embodiment of the present disclosure.
Figure 11B:
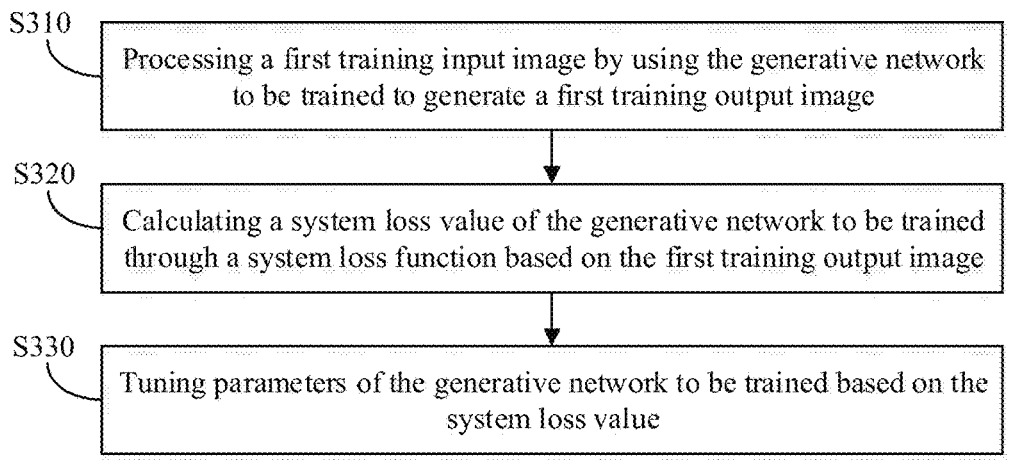
FIG. 11B is an exemplary flowchart of a process of training a generative network to be trained provided by at least one embodiment of the present disclosure.

FIG. 11A is a schematic block diagram of the architecture of training a generative network to be trained corresponding to the training method shown in FIG. 10 provided by at least one embodiment of the present disclosure, and FIG. 11B is an exemplary flowchart of the process of training a generative network to be trained provided by at least one embodiment of the present disclosure.

For instance, as shown in FIG. 11A and FIG. 11B, the training the generative network to be trained based on the discriminative network, i.e., step S300, includes steps S310 to S330.

S310: processing a first training input image by using the generative network to be trained to generate a first training output image.

For instance, similar to the input image in the aforementioned step S100, the first training input image can also include a photo taken and acquired by a camera of a smart phone, a camera of a tablet computer, a camera of a personal computer, a lens of a digital camera, a surveillance camera or a network camera, etc., and the input image can include a person image, an animal/plant image or a landscape image, etc., without being limited in the embodiments of the present disclosure. For instance, the first training input image is a low-quality image, and for instance, the quality of the first training input image is lower than the quality of a photo taken, for example, by a digital single mirror reflex camera. For instance, in some examples, the first training input image can be an image in RGB format, and the embodiments of the present disclosure include but are not limited to this case.

For instance, the generative network G to be trained may have the structure of the generative network shown in FIG. 6A or the structure of the generative network shown in FIG. 6B. For instance, initial parameters of the generative network G to be trained can be random numbers, and for instance, the random numbers conform to Gaussian distribution. It should be noted that the embodiments of the present disclosure are not limited to this case.

For instance, the specific process of step S310 can refer to the related description of the aforementioned step S200, that is, the first training input image corresponds to the input image, the first training output image corresponds to the output image, the process of generating the first training output image according to the first training input image can refer to the aforementioned process of generating the output image according to the input image, and details will not be repeated here.

Step S320: calculating a system loss value of the generative network to be trained through a system loss function based on the first training output image.

For instance, in some examples, as shown in FIG. 11A, the system loss function can include a generative network adversarial loss function, and accordingly, the system loss value can include a generative network adversarial loss value. For instance, as shown in FIG. 11A, in the training process of the generative network G to be trained, the first training output image can be processed by using the discriminative network D, and the generative network adversarial loss value can be calculated through the generative network adversarial loss function according to the output of the discriminative network D.

Figure 12:
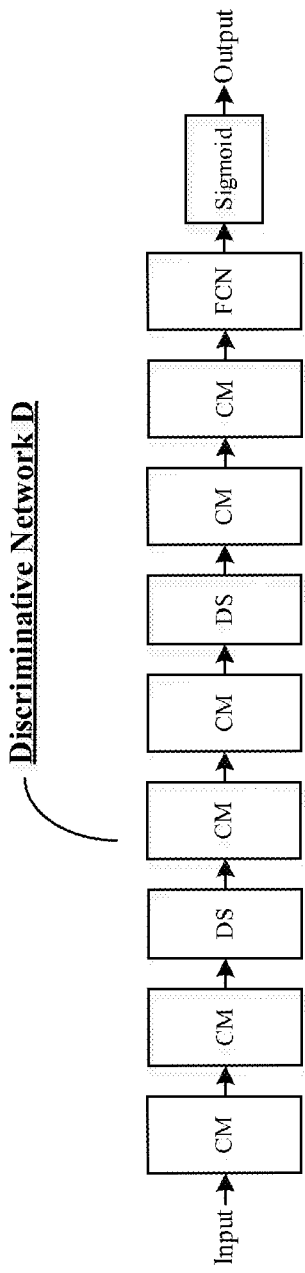
FIG. 12 is a schematic structural diagram of a discriminative network provided by at least one embodiment of the present disclosure.

FIG. 12 is a schematic structural diagram of a discriminative network provided by at least one embodiment of the present disclosure. For instance, as shown in FIG. 12, the discriminative network D includes a plurality of convolution modules CM, a plurality of down-sampling layers DS and a full connected layer FCN. For instance, the structures and functions of the convolution module CM, the down-sampling layer DS and the full connection layer FCN in the discriminative network D can refer to the aforementioned descriptions related to the convolution module, the down-sampling layer and the full connected layer, respectively, and the embodiments of the present disclosure are not limited to this case.

For instance, as shown in FIG. 12, in the discriminative network D, the plurality of convolution modules CM are connected in sequence, and there is a down-sampling layer DS between some adjacent convolution modules CM. For instance, as shown in FIG. 12, the discriminative network D includes six convolution modules CM connected in sequence, one down-sampling layer is between the second convolution module and the third convolution module, and one down-sampling layer is between the fourth convolution module and the fifth convolution module. The full connected layer FCN is connected to the last convolution module CM. For instance, each convolution module CM can include a convolution layer and an instance normalization layer; and for instance, at least part of the convolution module CM can also omit the instance normalization layer.

For instance, as shown in FIG. 12, the discriminative network D further includes an activation layer, and the activation layer is connected to the full connected layer FCN. For instance, as shown in FIG. 12, the activation function of the activation layer can adopt the Sigmoid function, so that the output of the activation layer (that is, the output of the discriminative network D) is a value within the value range of [0,1]. For instance, the discriminative network D can judge whether the quality of the first training output image is similar to the quality of a high-quality image (e.g., the quality of a photo taken by a digital single mirror reflex camera). Taking the case in which the first training output image serves as the input of the discriminative network D as an example, the discriminative network D processes the first training output image to obtain the output of the discriminative network D, and the value of the output of the discriminative network D indicates the similarity degree between the quality of the first training output image and the quality of a photo taken by a digital single mirror reflex camera. For instance, the larger the value output by the discriminative network D, for example, approaching to 1, indicating that the discriminative network D determines that the quality of the first training output image is more similar to the quality of the photo taken by the digital single mirror reflex camera, that is, the higher the quality of the first training output image. For instance, the smaller the value output by the discriminative network D, for example, approaching to 0, indicating that the discriminative network D determines that the quality of the first training output image is less similar to the quality of the photo taken by the digital single mirror reflex camera, that is, the lower the quality of the first training output image.

It should be noted that the discriminative network shown in FIG. 12 is illustrative. For instance, in some examples, the discriminative network shown in FIG. 12 can include more or fewer convolution modules or down-sampling layers. For instance, in some examples, the discriminative network shown in FIG. 12 can further include other modules or layer structures, and for instance, there can also be a flattening module before the full connected layer. For instance, in some examples, some modules or layer structures in the discriminative network shown in FIG. 12 can be replaced with other modules or layer structures, and for example, the fully connected layer can be replaced with a convolution layer which performs an averaging operation (AVG) (referring to FIG. 3 and the related description above), and the activation layer can be replaced with a softmax module of binary classification. Further, the embodiments of the present disclosure do not limit the structure of the discriminative network, that is, the embodiments of the present disclosure include but are not limited to the discriminative network structure shown in FIG. 12.

For instance, in some examples, the generative network adversarial loss function can be expressed as $$L_G = E_{z1 \sim P_{z1}(z1)}[1 - \log D(G(z1))],$$

where $L_G$ represents the generative network adversarial loss function, z1 represents the first training input image, $P_{z1}(z1)$ represents a set of first training input images (e.g., including a plurality of first training input images in a batch), G(z1) represents the first training output image, D(G(z1)) represents the output of the discriminative network based on the first training input image, and $E_{z1 \sim P_{z1}(z1)}$ represents that an expectation value corresponding to the set of first training input images is calculated to obtain the generative network adversarial loss value. Therefore, a batch gradient descent algorithm can be adopted to optimize the parameters of the generative network G to be trained.

It should be noted that the generative network adversarial loss function expressed by the above formula is illustrative, and the embodiments of the present disclosure include but are not limited to this case.

The training goal of the generative network G to be trained is to minimize the system loss value. Therefore, in the training process of the generative network G to be trained, minimizing the system loss value includes reducing the generative network adversarial loss value. For instance, in the training process of the generative network G to be trained, a label of the first training output image is set to be 1, that is, the quality of the first training output image needs to be determined by the discriminative network D to be consistent with the quality of a photo taken by a digital single mirror reflex camera. For instance, in the training process of the generative network G to be trained, the parameters of the generative network G to be trained are continuously tuned, so that the output of the discriminative network D corresponding to the first training output image generated by the generative network G after parameter tuning is continuously approaching to 1, thus continuously reducing the generative network adversarial loss value.

For instance, in some examples, as shown in FIG. 11A, the system loss function can further include a content loss function, and accordingly, the system loss value can include a content loss value. For instance, as shown in FIG. 11A, in the training process of the generative network G to be trained, an analysis network A can be used to process the first training output image, and the content loss value can be calculated through the content loss function according to the output of the analysis network A.

Figure 13:
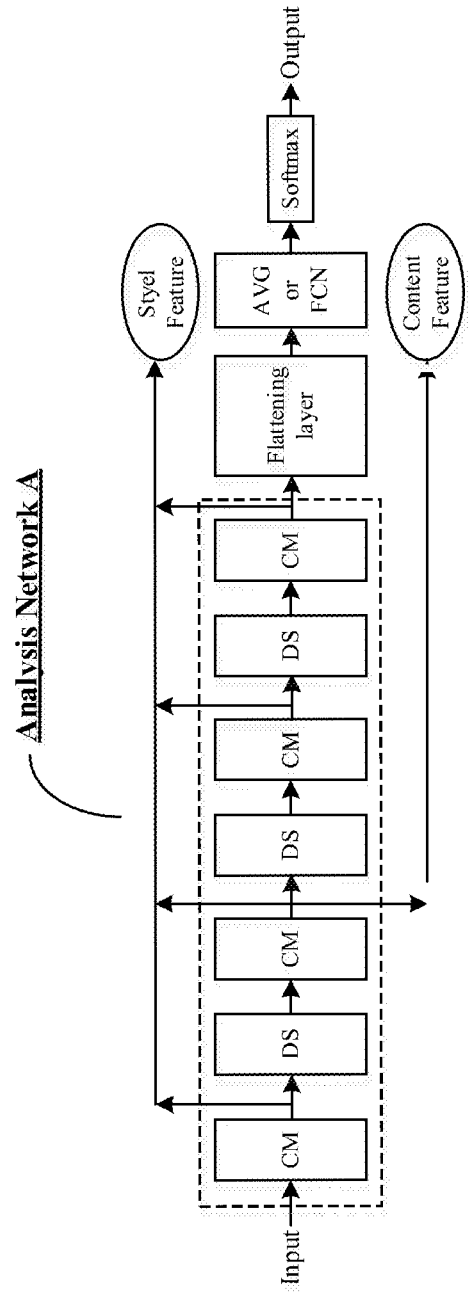
FIG. 13 is a schematic structural diagram of an analysis network provided by at least one embodiment of the present disclosure.

FIG. 13 is a schematic structural diagram of an analysis network provided by at least one embodiment of the present disclosure. For instance, as shown in FIG. 13, the analysis network A includes a plurality of convolution modules CM connected in sequence and a plurality of down-sampling layers DS interposed between adjacent convolution modules CM. For instance, each convolution module CM includes a convolution layer, and each convolution layer includes a plurality of convolution kernels which can be used to extract the content features and style features of the input image of the analysis network A. For instance, referring to FIG. 11A, the input of the analysis network A shown in FIG. 13 can include the first training input image and the first training output image. For instance, each convolution module CM can include a convolution layer and an instance normalization layer; and for instance, at least part of the convolution module CM can also omit the instance normalization layer.

For instance, the analysis network A can adopt a deep neural network which is capable of classifying images. As shown in FIG. 13, the input is processed by several convolution modules CM and down-sampling layers DS to extract features. The output of each convolution module CM is the input feature image corresponding to the input of the each convolution module CM. The down-sampling layer DS can reduce the size of the feature image and transmit it to the convolution module of the next stage. The plurality of convolution modules CM can output a plurality of feature images, and the plurality of feature images can characterize features of different stages (e.g., texture, edge, object, etc.) corresponding to the input. After being processed by several convolution modules CM and down-sampling layer DS, the feature images are input to a flattening layer, and the flattening layer converts the feature images into vectors and then transmits them to a full connected layer and a classifier. The classifier can include a softmax classifier, and the softmax classifier can output the probability of the input belonging to each category label, and the label with the largest probability will be the final output of the analysis network A. Therefore, the analysis network A realizes image classification.

For instance, the analysis network A can adopt a trained convolution neural network model. Therefore, in the training process of the generative network G to be trained, there is no need to tune the parameters (e.g., convolution kernels, etc.) of the analysis network A. For instance, the analysis network A can use a neural network model, such as AlexNet, GoogleNet, VGG, Deep Residual Learning, etc., to extract the content features and style features of the input. The VGG network is a kind of deep convolution neural network, which was developed by Visual Geometry Group of Oxford University and has been widely used in the field of visual recognition. For instance, the VGG network can include 19 layers, and some of them can be normalized.

It should be noted that, in some examples, in the training process of the generative network G to be trained, only part of the above analysis network A which is used to extract the features of the input is needed, such as, the plurality of convolution modules CM and the plurality of down-sampling layers DS as shown by the dashed frame in FIG. 13. For instance, in the analysis network A provided by the embodiment of the present disclosure, as shown in FIG. 13, at least two convolution modules CM are used to extract style features, and at least one convolution module CM is used to extract content features. It should be noted that the analysis network shown in FIG. 13 is illustrative. The embodiments of the present disclosure do not limit the structure of the analysis network and the specific details of extracting style features and content features (e.g., the number and stages of the first convolution modules for extracting style features and content features, etc.), etc. It should also be noted that, in some examples, in the training process of the generative network G to be trained, only part of the analysis network A which is used to extract the content features of the input is needed.

For instance, as shown in FIG. 11A, in the training process of the generative network G to be trained, the analysis network A is used to receive the first training input image and the first training output image, and generate and output a first content feature image of the first training input image and a second content feature image of the first training output image, respectively. For instance, content features represent the distribution of objects in the whole image. For instance, the content features include content information of the image.

For instance, in the training process of the generative network G to be trained, the analysis network A can be used to extract the first content feature image of the first training input image and the second content feature image of the first training output image, and according to the first content feature image and the second content feature image, the content loss value of the generative network G to be trained can be calculated through the content loss function. For instance, in some examples, for the analysis network A shown in FIG. 13, a single-layer content loss function can be expressed as:

$$C_m = \frac{1}{2S_1} \sum_{ij} (F_{ij}^m - P_{ij}^m)^2,$$

where $S_1$ is a constant, $F_{ij}^m$ represents a value of the j-th position in the first content feature image of the first training input image extracted by the i-th convolution kernel in the m-th convolution module, and $P_{ij}^m$ represents a value of the j-th position in the second content feature image of the first training output image extracted by the i-th convolution kernel in the m-th convolution module.

For instance, in the analysis network A shown in FIG. 13, the content features of the input image (for instance, the input image here includes the first training input image and the first training output image) can be extracted by at least one convolution module CM, and the content loss function can be expressed as:

$$L_{content} = \sum_m w_{1m} \cdot C_m,$$

where $L_{content}$ represents the content loss function, $C_m$ represents the single-layer content loss function of the m-th convolution module in the at least one convolution module, and $w_{1m}$ represents a weight of $C_m$.

For instance, in the training process of the generative network G to be trained, minimizing the system loss value includes reducing the content loss value. For instance, in the case where the generative network G to be trained is used for image enhancement processing, it is necessary to make the output and input of the generative network G to be trained have the same content features, that is, the first training output image retains the content of the first training input image. For instance, in the training process of the generative network G to be trained, the parameters of the generative network G to be trained are continuously tuned, so that content features of the first training output image generated by the generative network G to be trained after parameter tuning are continuously approaching to content characteristics of the first training input image, thereby continuously reducing the content loss value.

For instance, in some examples, as shown in FIG. 11A, the system loss function can further include a color loss function, and accordingly, the system loss value can include a color loss value. For instance, as shown in FIG. 11A, in the training process of the generative network G to be trained, the color loss function can be established according to the first training output image and a second training input image, so as to calculate the color loss value.

For instance, in some examples, the color loss function can be expressed as:

$$L_{color} = abs(gaussian(G(z1)) - gaussian(I1)),$$

where $L_{color}$ represents the color loss function, G(z1) represents the first training output image, I1 represents the second training input image, gaussian ( ) represents Gaussian blur operation, and abs ( ) represents absolute value operation.

For instance, the second training input image can be a high-quality image, that is, the quality of the second training input image is higher than the quality of the first training input image, and for instance, the second training input image can be a photo taken by a digital single mirror reflex camera. For instance, the second training input image can include a person image, an animal/plant image, a landscape image, etc., without being limited in the embodiments of the present disclosure.

For instance, in some examples, the quality of the first training output image is similar to the quality of a photo taken by a digital single mirror reflex camera, which can be at least partially embodied in that the color distribution and luminance distribution of the first training output image and the photo taken by the digital single mirror reflex camera are nearly the same in each local region.

For instance, in the training process of the generative network G to be trained, minimizing the system loss value includes reducing the color loss value. For instance, in the case where the generative network G to be trained is used for image enhancement processing, it is necessary to enable the color distribution and luminance distribution of the first training output image in each local region to be similar to the color distribution and luminance distribution of the photo taken by the digital single mirror reflex camera in the each local region. For instance, in the training process of the generative network G to be trained, the parameters of the generative network G to be trained are continuously tuned, so that the color distribution and luminance distribution of the first training output image generated by the generative network G to be trained after tuning are continuously approaching to the color distribution and luminance distribution of the photo taken by the digital single mirror reflex camera in each local region, thus continuously reducing the color loss value.

For instance, in some examples, the first training output image has a first color channel, a second color channel and a third color channel. For instance, reference can be made to the relevant description of the output image in the aforementioned image processing method, and details will not be repeated here. For instance, as shown in FIG. 11A, the system loss function can further include a contrast loss function, and accordingly, the system loss value can include a contrast loss value. For instance, as shown in FIG. 11A, in the training process of the generative network G to be trained, the contrast loss function can be established according to the first training output image and a third training input image, so as to calculate the contrast loss value.

For instance, in some examples, the contrast loss function can be expressed as:

$$L_{L1} = 0.299 * abs(F_{G(z1)} - F_{I2}) + 0.587 * abs(S_{G(z1)} - S_{I2}) + 0.299 * abs(T_{G(z1)} - T_{I2}),$$

where $L_{L1}$ represents the contrast loss function, G(z1) represents the first training output image, I2 represents a third training input image, $F_{G(z1)}$, $S_{G(z1)}$ and $T_{G(z1)}$ represent data information of the first color channel, the second color channel and the third color channel of the first training output image, respectively, $F_{I2}$, $S_{I2}$ and $T_{I2}$ represent the data information of the first color channel, the second color channel and the third color channel of the third training input image, respectively, and abs ( ) represents the absolute value operation.

For instance, the third training input image can have the same scene as the first training input image, that is, the third training input image may have the same content as the first training input image; and the quality of the third training input image is higher than the quality of the first training input image. For instance, the third training input image can be a photo taken by a digital single mirror reflex camera. Because the third training input image can be equivalent to a target output image of the generative network G to be trained, the convergence speed and processing speed can be improved by adding the contrast loss function into the system loss function.

For instance, in the training process of the generative network G to be trained, minimizing the system loss value includes reducing the contrast loss value. For instance, in the case where the generative network G to be trained is used for image enhancement processing, it is necessary to make the first training output image similar to the third training input image. For instance, in the training process of the generative network G to be trained, the parameters of the generative network G to be trained are continuously tuned, so that the first training output image generated by the generative network G to be trained after parameter tuning is approaching to the third training input image, thereby continuously reducing the contrast loss value.

For instance, in the embodiments of the present disclosure, the system loss function of the generative network G to be trained can be expressed as:

$$L_{total} = \alpha L_G + \beta L_{content} + \chi L_{color} + \delta L_{L1},$$

where $L_{total}$ represents the system loss function, $\alpha$, $\beta$, $\chi$ and $\delta$ are the weights of the generative network adversarial loss function, the content loss function, the color loss function and the contrast loss function in the system loss function, respectively.

For instance, in some examples, in order to avoid overfitting, the weight of the contrast loss function can be less than the weight of the content loss function; and for instance, in some examples, the weight ratio of the contrast loss function does not exceed 20%.

For instance, in step S320, the system loss value can be calculated through the system loss function expressed by the above formula, and then the subsequent step S330 is executed to tune the parameters of the generative network G to be trained, thereby realizing step S300.

Step S330: tuning parameters of the generative network to be trained based on the system loss value.

For instance, an optimization function (not shown in FIG. 11A) can also be included in the training process of the generative network G to be trained, the optimization function can calculate the error values of the parameters of the generative network G according to the system loss value calculated through the system loss function, and tune the parameters of the generative network G to be trained according to the error values. For instance, the optimization function can adopt a stochastic gradient descent (SGD) algorithm, or a batch gradient descent (BGD) algorithm, etc., to calculate the error values of the parameters of the generative network G For instance, taking the case in which the generative network G to be trained is the generative network shown in FIG. 6A as an example, the tuning the parameters of the generative network G to be trained includes: tuning the parameters of the generative network shown in FIG. 6A other than the parameters of the synthesis module Merg, that is, the parameters of the synthesis module Merg remain unchanged. For instance, taking the case in which the generative network G to be trained is the generative network shown in FIG. 6B as an example, the tuning the parameters of the generative network G to be trained includes: tuning the parameters of the generative network shown in FIG. 6B other than the parameters of the conversion module Tran and the synthesis module Merg, that is, the parameters of the conversion module Tran and the synthesis module Merg remain unchanged.

For instance, the training the generative network to be trained based on the discriminative network, i.e., step S300, can further include: judging whether the training of the generative network G to be trained meets a predetermined condition, and if the predetermined condition is not met, repeating the training process of the generative network G to be trained; and if the predetermined condition is met, stopping the training process of the generative network G to be trained at the present stage, so as to obtain the trained generative network G at the present stage. It should be noted that the trained generative network G at the present stage can be used as the generative network G to be trained at the next stage. For instance, in an example, the above predetermined condition is that the system loss values corresponding to two (or more) first training input images are no longer significantly reduced. For instance, in another example, the above predetermined condition is that the number of training times or training periods of the generative network G reaches a predetermined number. It should be noted that the embodiments of the present disclosure are not limited to these cases.

For instance, as shown in FIG. 11A, in the training process of the generative network G to be trained, it is necessary to train the generative network G to be trained in conjunction with the discriminative network D and the analysis network A. It should be noted that in the training process of generative network Q the parameters of the discriminative network D remain unchanged. It should be noted that in the case where the analysis network A adopts a trained convolution neural network model, the parameters of the analysis network A can also remain unchanged.

It should be noted that in the present disclosure, for instance, the generative network to be trained, the discriminative network, the analysis network, and various layers or modules (such as convolution module, up-sampling layer, down-sampling layer, etc.) included in these neural networks correspond to the programs/methods that execute the corresponding processing procedures, for example, via corresponding software, firmware, hardware, etc.; furthermore, the above embodiments merely illustratively describe the training process of the generative network to be trained. Those skilled in the art should know that in the training stage, it is necessary to use a large number of sample images to train the neural network; and at the same time, in the training process of each sample image, multiple iterations can be included to tune the parameters of the generative network to be trained. For another example, the training stage further includes performing fine-tune operation on the parameters of the generative network to be trained, so as to obtain more optimized parameters.

Figure 14A:
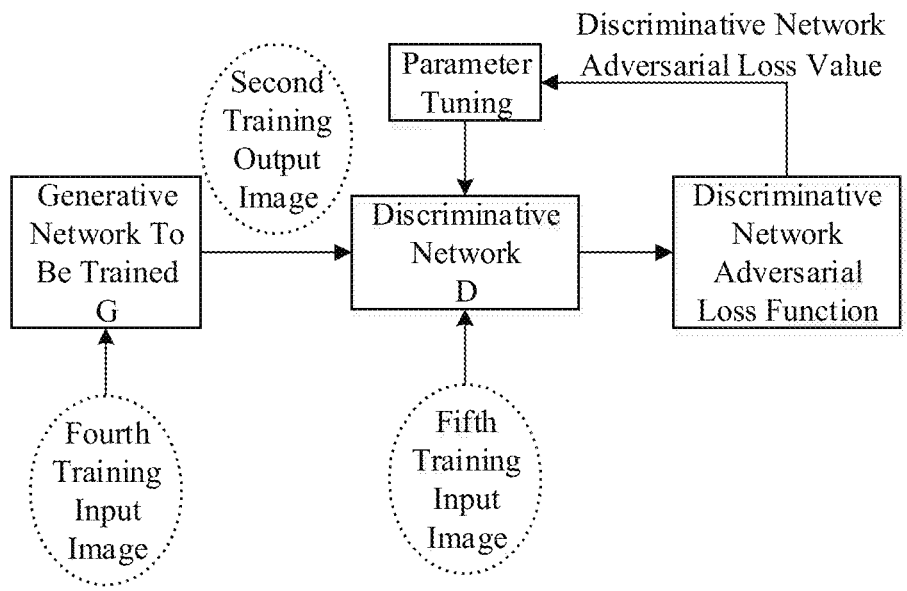
FIG. 14A is a schematic block diagram of an architecture of training a discriminative network corresponding to the training method shown in FIG. 10 provided by at least one embodiment of the present disclosure.
Figure 14B:
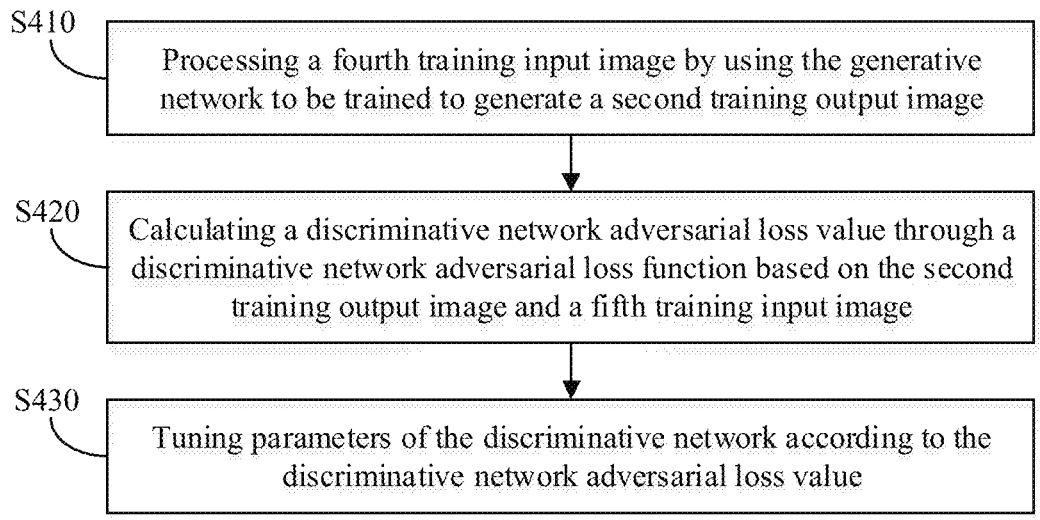
FIG. 14B is an exemplary flowchart of a process of training a discriminative network provided by at least one embodiment of the present disclosure.

FIG. 14A is a schematic block diagram of an architecture of training a discriminative network corresponding to the training method shown in FIG. 10 provided by at least one embodiment of the present disclosure, and FIG. 14B is an exemplary flowchart of a process of training a discriminative network provided by at least one embodiment of the present disclosure.

For instance, as shown in FIG. 14A and FIG. 14B, the training the discriminative network based on the generative network to be trained, i.e., step S400, includes steps S410 to S430 as shown below.

Step S410: processing a fourth training input image by using the generative network to be trained to generate a second training output image;

Step S420: calculating a discriminative network adversarial loss value through a discriminative network adversarial loss function based on the second training output image and a fifth training input image;

Step S430: tuning parameters of the discriminative network according to the discriminative network adversarial loss value.

For instance, the training the discriminative network based on the generative network to be trained, i.e., step S400, can further include: judging whether the training of the discriminative network D meets a predetermined condition, and if the predetermined condition is not met, repeating the training process of the discriminative network D; and if the predetermined condition is met, stopping the training process of the discriminative network D at the present stage to obtain the trained discriminative network D at the present stage. For instance, in an example, the predetermined condition is that the discriminative network adversarial loss values corresponding to two (or more) fifth training input images and the second training output images are no longer significantly reduced. For instance, in another example, the above predetermined condition is that the number of training times or training periods of the discriminative network D reaches a predetermined number. It should be noted that the embodiments of the present disclosure are not limited to these cases.

For instance, as shown in FIG. 14A, in the training process of the discriminative network D, it is necessary to train the discriminative network D in conjunction with the generative network G to be trained. It should be noted that in the training process of the discriminative network D, the parameters of the generative network G to be trained remain unchanged.

It should be noted that the above embodiments merely illustratively describe the training process of the discriminative network. Those skilled in the art should know that in the training stage, it is necessary to use a large number of sample images to train the neural network; and at the same time, in the training process of each sample image, multiple iterations can be included to tune the parameters of the discriminative network. For another example, the training stag further includes performing fine-tune operation on the parameters of the discriminative network, so as to obtain more optimized parameters.

For instance, initial parameters of the discriminative network D can be random numbers, and for instance, the random numbers conform to Gaussian distribution, and the embodiments of the present disclosure are not limited to this case.

For instance, an optimization function (not shown in FIG. 14A) can also be included in the training process of the discriminative network D, the optimization function can calculate the error values of the parameters of the discriminative network D according to the discriminative network adversarial loss value calculated through the discriminative network adversarial loss function, and tune the parameters of the discriminative network D according to the error values. For instance, the optimization function can adopt a stochastic gradient descent (SGD) algorithm or a batch gradient descent, BGD) algorithm, etc., to calculate the error values of the parameters of the discriminative network D.

For instance, the fourth training input image can be the same as the first training input image, and for instance, the set of fourth training input images and the set of first training input images are the same image set. For instance, the fourth training input image can also include a photo taken and by a camera of a smart phone, a camera of a tablet computer, a camera of a personal computer, a lens of a digital camera, a surveillance camera or a network camera, etc., and the fourth training input image may include a character image, an animal/plant image, a landscape image, etc., without being limited in the embodiments of the present disclosure. For instance, the fourth training input image is a low-quality image, and for instance, the quality of the fourth training input image is lower than the quality of a photo taken by a digital single mirror reflex camera. For instance, in some examples, the fourth training input image can be an image in RGB format, and the embodiments of the present disclosure include but are not limited to this case.

For instance, the fifth training input image is a high-quality image, that is, the quality of the fifth training input image is higher than the quality of the fourth training input image. For instance, the fifth training input image can be a photo taken by a digital single mirror reflex camera. For instance, the fifth training input image can include a person image, an animal/plant image, a landscape image, etc., without being limited in the embodiments of the present disclosure. For instance, the fifth training input image can be the same as the second training input image, and for instance, the set of fifth training input images and the set of second training input images are the same image set; and of course, the fifth training input image may also be different from the second training input image, and the embodiments of the present disclosure are not limited to these cases.

For instance, the discriminative network D can be the discriminative network as shown in FIG. 12, but is not limited thereto.

For instance, in some examples, the discriminative network adversarial loss function can be expressed as:

$$L_D = -E_{x \sim P_{data}(x)}[\log D(x)] - E_{z2 \sim P_{z2}(z2)}[1 - \log D(G(z2))],$$

where $L_D$ represents the discriminative network adversarial loss function, x represents the fifth training input image, $P_{data}(x)$ represents a set of fifth training input images (e.g., including a plurality of fifth training input images in a batch), $D(x)$ represents an output of the discriminative network based on the fifth training input image, $E_{x \sim P_{data}(x)}$ represents an expectation value corresponding to the set of fifth training input images, z2 represents the fourth training input image, $P_{z2}(z2)$ represents a set of fourth training input images, $G(z2)$ represents the second training output image, and $D(G(z2))$ represents an output of the discriminative network based on the second training output image, and $E_{z \sim P_z(z)}$ represents an expectation value corresponding to the set of fourth training input images.

It should be noted that the discriminative network adversarial loss function expressed by the above formula is illustrative, and the present disclosure includes but is not limited to this case.

The training goal of discriminative network D is to minimize the discriminative network adversarial loss value. For instance, in the training process of the discriminative network D, a label of the fifth training input image is set to be 1, that is, it is necessary for the discriminative network D to determine that the fifth training input image is, for example, a photo image taken by a digital single mirror reflex camera, that is, the fifth training input image is a high-quality image; and at the same time, a label of the second training output image is set to be 0, that is, it is necessary for the discriminative network D to determine that the second training output image is not a photo image taken by a digital single mirror reflex camera, that is, the second training output image is a low-quality image.

For instance, in the training process of the discriminative network D, the parameters of the discriminative network D are continuously tuned, so that the discriminative network D after parameter tuning can accurately determine the quality of the fifth training input image and the quality of the second training output image, that is, the output of the discriminative network D corresponding to the fifth training input image is continuously approaching to 1, and the output of the discriminative network D corresponding to the second training output image is continuously approaching to 0, thus continuously reducing the generative network adversarial loss value.

For instance, in the embodiment of the present disclosure, the training of the generative network G to be trained and the training of the discriminative network D are alternately and iteratively performed. For instance, for untrained generative network G and discriminative network D, generally, the discriminative network D is firstly trained at a first stage to improve the discrimination ability of the discriminative network D (i.e., the ability to discriminate the quality of the input of the discriminative network D) and obtain the trained discriminative network D at the first stage; then, based on the trained discriminative network D at the first stage, the generative network G (that is, the generative network G to be trained) is trained at a first stage, so as to improve the image enhancement processing ability of the generative network G (that is, the ability to enable the output of the generative network G to be a high-quality image) and obtain the trained generative network G at the first stage. Similar to the training at the first stage, in the training at the second stage, based on the trained generative network G at the first stage, the trained discriminative network D at the first stage is trained at the second stage to improve the discrimination ability of the discriminative network D and obtain the trained discriminative network D at the second stage; then, based on the trained discriminative network D at the second stage, the trained generative network G at the first stage is trained at the second stage to improve the image enhancement processing ability of the generative network G and obtain the trained generative network G at the second stage; and so on. Then, the discriminative network D and the generative network G are trained at a third stage, a fourth stage, . . . , until the quality of the output of the generative network G can be similar to the quality of a photo taken by a digital single mirror reflex camera, that is, the training output image is a high-quality image.

It should be noted that in the alternate training processes of generative network G and discriminating network D, the adversarial between the generative network G and discriminating network D is embodied in that the outputs of the generative network G (i.e., the high-resolution image generated by the generative network G) have different labels in their separate training processes (the label is 1 in the training process of the generative network G and the label is 0 in the training process of the discriminating network D), and is also embodied in that the second part of the discriminative network adversarial loss function (that is, the part related to the high-resolution image generated by the generative network G) is contrary to the generative network adversarial loss function in the system loss function. It should also be noted that, ideally, the image output by the generative network G after being trained is a high-quality image (i.e., the quality thereof is close to the quality of a photo taken, for example, by a digital single mirror reflex camera), and the output of the discriminative network D corresponding to the fifth training input image and the output of the discriminative network D corresponding to the second training output image generated by the generative network G are both 0.5, that is, the generative network G and the discriminative network D achieve Nash equilibrium through adversarial.

The training method of the neural network provided by at least one embodiment of the present disclosure combines the generative adversarial network technology, and the generative network trained by the training method can combine the branching process and the weight sharing process to perform an image enhancement process, which can not only reduce the number of parameters, but also facilitate the calculation of gradients during back propagation, thereby improving the processing speed and convergence speed while outputting a high-quality images.

Figure 15:
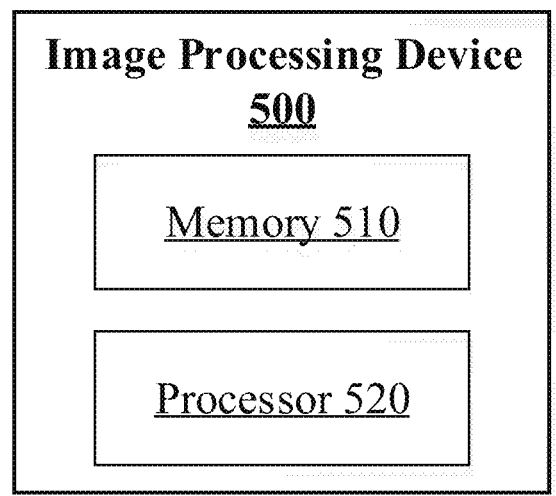
FIG. 15 is a schematic block diagram of an image processing device provided by at least one embodiment of the present disclosure.

At least one embodiment of the present disclosure further provides an image processing device. FIG. 15 is a schematic block diagram of an image processing device provided by at least one embodiment of the present disclosure.

For instance, as shown in FIG. 15, the image processing device 500 includes a memory 510 and a processor 520. For instance, the memory 510 is configured to store computer readable instructions non-transitorily, and the processor 520 is configured to execute the computer readable instructions. Upon the computer readable instructions being executed by the processor 520, the image processing method provided by any embodiment of the present disclosure is executed.

For instance, the memory 510 and the processor 520 can communicate with each other directly or indirectly. For instance, in some other examples, components, such as the memory 510 and the processor 520, can communicate with each other via network connection. The network can include a wireless network, a wired network, and/or any combination of the wireless network and the wired network. The network can include local area network (LAN), the Internet, a telecommunication network, Internet of Things based on the Internet and/or the telecommunication network, and/or any combination of the above networks, etc. The wired network, for instance, can communicate by means of twisted pair, coaxial cable or optical fiber transmission, etc. The wireless network, for instance, can adopt a communication mode such as 3G/4G/5G mobile communication network, Bluetooth, Zigbee or WiFi, etc. The present disclosure does not limit the type and function of the network.

For instance, the processor 520 can control other components in the image processing device to realize desired functions. The processor 520 can be an element having data processing capability and/or program execution capability, such as a central processing unit (CPU), a tensor processing unit (TPU), or a graphics processing unit (GPU). The CPU can have an X86 or ARM architecture, etc. The GPU can be integrated directly on the motherboard alone or built into the Northbridge chip of the motherboard. The GPU can also be built into the CPU.

For instance, the memory 510 can include one or a plurality of computer program products, and the computer programs can include a computer readable storage medium of diverse forms, such as a volatile memory and/or a non-volatile memory. The volatile memory, for instance, can include a random access memory (RAM) and/or a cache, etc. The non-volatile memory, for instance, can include a read-only memory (ROM), a hard disk, an erasable programmable read-only memory (EPROM), a portable compact disk read-only memory (CD-ROM), a USB memory, or a flash memory, etc.

For instance, one or a plurality of computer instructions can be stored on the memory 510, and the processor 520 can execute the computer instructions to realize various functions. The computer readable storage medium can also store various applications and various data, such as the first to fifth training input images, and various data used and/or generated by the applications.

For instance, in the case where some computer instructions stored on the memory 510 are executed by the processor 520, one or more steps in the image processing method described above can be executed. Moreover, for instance, in the case where some other computer instructions stored on the memory 510 are executed by the processor 520, one or more steps in the training method of the neural network described above can be executed.

For instance, the detailed description of the processing procedure of the image processing method can refer to the related descriptions in the above-mentioned embodiments of the image processing method, and the detailed description of the processing procedure of the training method of the neural network can refer to the related descriptions in the above-mentioned embodiments of the training method of the neural network. It should be noted that the image processing device provided by the embodiments of the present disclosure is exemplary, not restrictive, and may also include other conventional components or structures according to the actual application requirements. For instance, in order to realize the necessary functions of the image processing device, those skilled in the art may set other conventional components or structures according to specific application scenarios, the embodiments of the present disclosure are not limited to this case.

Technical effects of the image processing device provided by at least one embodiment of the present disclosure can refer to the corresponding descriptions of image processing method and the training method of the neural network in the above embodiments, and will not be repeated here.

Figure 16:
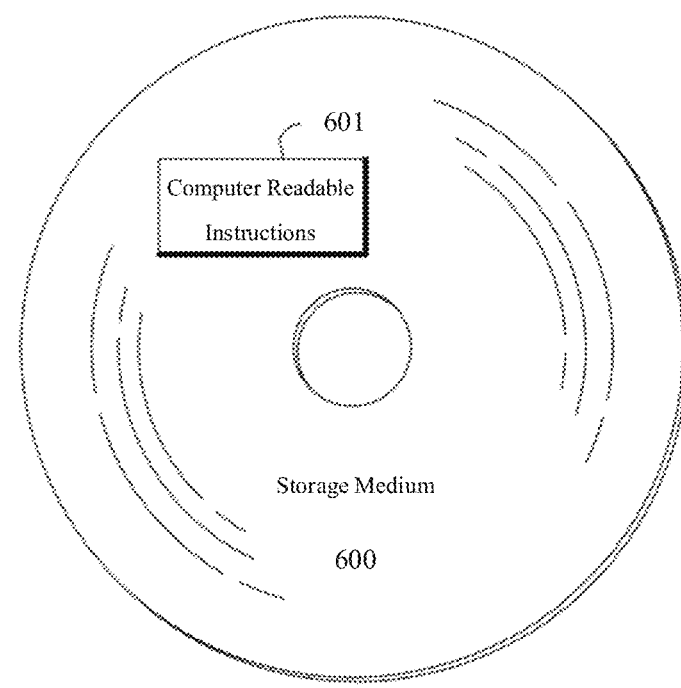
FIG. 16 is a schematic diagram of a storage medium provided by at least one embodiment of the present disclosure.

At least one embodiment of the present disclosure further provides a storage medium. FIG. 16 is a schematic diagram of a storage medium provided by an embodiment of the present disclosure. For instance, as shown in FIG. 16, the storage medium 600 is configured to store computer readable instructions 601 non-transitorily. Upon the non-transitory computer readable instructions 601 being executed by a computer (including a processor), instructions of the image processing method provided by any embodiment of the present disclosure can be executed.

For instance, one or more computer instructions can be stored on the storage medium 600. Some computer instructions stored on the storage medium 600 can be, for instance, instructions for implementing one or more steps in the above image processing method. Some other computer instructions stored on the storage medium can be, for instance, instructions for implementing one or more steps in the above training method of the neural network.

For instance, the storage medium can include a storage component of a tablet, a hard disk of a personal computer, a random access memory (RAM), a read-only memory (ROM), an erasable programmable read-only memory (EPROM), a portable compact disk read-only memory (CD-ROM), a flash memory, or any combination of the above-mentioned storage media, or other suitable storage medium.

Technical effects of the storage medium provided by the embodiments of the present disclosure can refer to the corresponding descriptions of image processing method and the training method of the neural network in the above embodiments, and are not repeated here.

For the disclosure, the following statements should be noted:

(1) The accompanying drawings related to the embodiment(s) of the present disclosure involve only the structure (s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. An image processing method, comprising:
obtaining an input image; and
processing the input image by using a generative network to generate an output image,
wherein the generative network comprises a first sub-network and at least one second sub-network, and
the processing the input image by using the generative network to generate the output image comprises:
processing the input image by using the first sub-network to obtain a plurality of first feature images;
performing a branching process and a weight sharing process on the plurality of first feature images by using the at least one second sub-network to obtain a plurality of second feature images; and
processing the plurality of second feature images to obtain the output image,
wherein the generative network further comprises a third sub-network, and
the processing the plurality of second feature images to obtain the output image, comprises:
processing the plurality of second feature images to obtain a plurality of third feature images;
processing the plurality of third feature images by using the third sub-network to obtain a plurality of fourth feature images; and
performing a synthesis process on the plurality of fourth feature images to obtain the output image,
wherein the third sub-network comprises a second backbone network, a fourth branch network, a fifth branch network, and a sixth branch network,
the processing the plurality of third feature images by using the third sub-network to obtain the plurality of fourth feature images, comprises:
processing the plurality of third feature images by using the second backbone network to obtain a plurality of fifth feature images;
dividing the plurality of fifth feature images into a fourth branch input, a fifth branch input, and a sixth branch input; and
processing the fourth branch input by using the fourth branch network to obtain a fourth feature image corresponding to the fourth branch network, processing the fifth branch input by using the fifth branch network to obtain a fourth feature image corresponding to the fifth branch network, and processing the sixth branch input by using the sixth branch network to obtain a fourth feature image corresponding to the sixth branch network; and the plurality of fourth feature images comprises the fourth feature image corresponding to the fourth branch network, the fourth feature image corresponding to the fifth branch network and the fourth feature image corresponding to the sixth branch network.

2. The image processing method according to claim 1, wherein each second sub-network comprises a first branch network, a second branch network and a third branch network, and the branching process of the each second sub-network comprises:
dividing an input of the each second sub-network into a first branch input, a second branch input and a third branch input; and
processing the first branch input by using the first branch network to obtain a first branch output, processing the second branch input by using the second branch network to obtain a second branch output, and processing the third branch input by using the third branch network to obtain a third branch output;
the at least one second sub-network comprises a first-sequence second sub-network, the first-sequence second sub-network is connected to the first sub-network, and the plurality of first feature images serve as an input of the first-sequence second sub-network.

3. The image processing method according to claim 2, wherein each second sub-network further comprises a first backbone network, and the weight sharing process of each second sub-network comprises:
concatenating the first branch output, the second branch output and the third branch output to obtain a first intermediate output; and
processing the first intermediate output by using the first backbone network to obtain an output of the each second sub-network.

4. The image processing method according to claim 3, wherein a process of the first branch network comprises a standard convolution process, a process of the second branch network comprises a standard convolution process, a process of the third branch network comprises a standard convolution process, and a process of the first backbone network comprises a standard convolution process and a down-sampling process.

5. The image processing method according to claim 1, wherein a process of the second backbone network comprises an up-sampling process, a process of the fourth branch network comprises a standard convolution process, a process of the fifth branch network comprises a standard convolution process, and a process of the sixth branch network comprises a standard convolution process.

6. The image processing method according to claim 5, wherein the process of the fourth branch network further comprises an up-sampling process, the process of the fifth branch network further comprises an up-sampling process, and the process of the sixth branch network further comprises an up-sampling process.

7. The image processing method according to claim 1, wherein a process of the first sub-network comprises a standard convolution process, and the processing the input image by using the first sub-network to obtain the plurality of first feature images, comprises:
performing the standard convolution process on the input image by using the first sub-network to obtain the plurality of first feature images.

8. The image processing method according to claim 1, wherein the input image has a first color channel, a second color channel, and a third color channel, the first sub-network comprises a conversion module, a seventh branch network, an eighth branch network, a ninth branch network, and a third backbone network, and the processing the input image by using the first sub-network to obtain the plurality of first feature images, comprises:
converting, by using the conversion module, data information of the first color channel, the second color channel and the third color channel of the input image into data information of a first luminance channel, a first color difference channel and a second color difference channel of an intermediate input image;
processing data information of the first luminance channel of the intermediate input image by using the seventh branch network to obtain a seventh branch output, processing data information of the first color difference channel of the intermediate input image by using the eighth branch network to obtain an eighth branch output, and processing data information of the second color difference channel of the intermediate input image by using the ninth branch network to obtain a ninth branch output;
concatenating the seventh branch output, the eighth branch output and the ninth branch output to obtain a second intermediate output; and
processing the second intermediate output by using the third backbone network to obtain the plurality of first feature images.

9. The image processing method according to claim 8, wherein a process of the seventh branch network comprises a standard convolution process and a down-sampling process, a process of the eighth branch network comprises a standard down-sampling process, and a process of the ninth branch network comprises a standard down-sampling process.

10. The image processing method according to claim 9, wherein a process of the fourth branch network comprises a standard convolution process and an up-sampling process, a process of the fifth branch network comprises a standard convolution process and a standard up-sampling process, and a process of the sixth branch network comprises a standard convolution process and a standard up-sampling process.

11. The image processing method according to claim 1, wherein the generative network further comprises a dense sub-network, and the dense sub-network comprises N dense modules, the processing the plurality of second feature images to obtain the plurality of third feature images, comprises:
processing the plurality of second feature images by using the dense sub-network to obtain the plurality of third feature images;

wherein the plurality of second feature images serve as an input of a first dense module in the N dense modules, the plurality of second feature images are concatenated with outputs of i−1 dense modules which are before an i-th dense module in the N dense modules, to serve as an input of the i-th dense module, and the plurality of second feature images are concatenated with the output of each dense module to serve as the plurality of third feature images, where N and i are integers, N≥2, i≥2 and i≤N.

12. The image processing method according to claim 1, wherein the generative network further comprises a synthesis module, the performing the synthesis process on the plurality of fourth feature images to obtain the output image, comprises:

performing the synthesis process on the plurality of fourth feature images by using the synthesis module to obtain the output image.

13. The image processing method according to claim 12, wherein the synthesis module comprises a first conversion matrix, the performing the synthesis process on the plurality of fourth feature images by using the synthesis module to obtain the output image, comprises:

converting, by using the first conversion matrix, data information of the fourth feature image corresponding to the fourth branch network, data information of the fourth feature image corresponding to the fifth branch network and data information of the fourth feature image corresponding to the sixth branch network into data information of a first color channel, data information of a second color channel and data information of a third color channel of the output image, so as to obtain the output image.

14. A training method of a neural network, comprising:

training a discriminative network based on a generative network to be trained;

training the generative network to be trained based on the discriminative network; and alternately executing the above training processes to obtain a generative network, wherein the generative network is configured to process an input image network to generate an output image, the generative network comprises a first sub-network and at least one second sub-network, the first sub-network is configured to process the input image to obtain a plurality of first feature images, the at least one second sub-network is configured to perform a branching process and a weight sharing process on the plurality of first feature images to obtain a plurality of second feature images, and the plurality of second feature images is processed to obtain the output image;

the training the generative network to be trained based on the discriminative network, comprises:

processing a first training input image by using the generative network to be trained to generate a first training output image;

calculating a system loss value of the generative network to be trained through a system loss function based on the first training output image; and tuning parameters of the generative network to be trained based on the system loss value, wherein the generative network further comprises a third sub-network, the plurality of second feature images is processed to obtain a plurality of third feature images; the plurality of third feature images is processed to obtain a plurality of fourth feature images by using the third sub-network; and the plurality of fourth feature images is performed through a synthesis process to obtain the output image, wherein the third sub-network comprises a second backbone network, a fourth branch network, a fifth branch network, and a sixth branch network, the plurality of third feature images is processed to obtain a plurality of fifth feature images by using the second backbone network, the plurality of fifth feature images is divided into a fourth branch input, a fifth branch input, and a sixth branch input, the fourth branch input is processed by using the fourth branch network to obtain a fourth feature image corresponding to the fourth branch network, the fifth branch input is processed by using the fifth branch network to obtain a fourth feature image corresponding to the fifth branch network, and the sixth branch input is processed by using the sixth branch network to obtain a fourth feature image corresponding to the sixth branch network; and wherein the plurality of fourth feature images comprises the fourth feature image corresponding to the fourth branch network, the fourth feature image corresponding to the fifth branch network and the fourth feature image corresponding to the sixth branch network.

15. The training method according to claim 14, wherein the training the discriminative network based on the generative network to be trained, comprises:

processing a fourth training input image by using the generative network to be trained to generate a second training output image;

calculating a discriminative network adversarial loss value through a discriminative network adversarial loss function based on the second training output image and a fifth training input image; and tuning parameters of the discriminative network according to the discriminative network adversarial loss value, wherein a quality of the fifth training input image is higher than quality of the fourth training input image.

16. An image processing device, comprising:

a memory, configured to store computer readable instructions non-transitorily; and a processor, configured to execute the computer readable instructions, wherein upon the computer readable instructions being executed by the processor, an image processing method is executed, and the image processing method comprises:

obtaining an input image; and processing the input image by using a generative network to generate an output image, wherein the generative network comprises a first sub-network and at least one second sub-network, and the processing the input image by using the generative network to generate the output image comprises:

processing the input image by using the first sub-network to obtain a plurality of first feature images;

performing a branching process and a weight sharing process on the plurality of first feature images by using the at least one second sub-network to obtain a plurality of second feature images; and processing the plurality of second feature images to obtain the output image, wherein the generative network further comprises a third sub-network, and the processing the plurality of second feature images to obtain the output image, comprises:
  processing the plurality of second feature images to obtain a plurality of third feature images;
  processing the plurality of third feature images by using the third sub-network to obtain a plurality of fourth feature images; and
  performing a synthesis process on the plurality of fourth feature images to obtain the output image,
wherein the third sub-network comprises a second backbone network, a fourth branch network, a fifth branch network, and a sixth branch network,
the processing the plurality of third feature images by using the third sub-network to obtain the plurality of fourth feature images, comprises:
  processing the plurality of third feature images by using the second backbone network to obtain a plurality of fifth feature images;
  dividing the plurality of fifth feature images into a fourth branch input, a fifth branch input, and a sixth branch input; and
  processing the fourth branch input by using the fourth branch network to obtain a fourth feature image corresponding to the fourth branch network, processing the fifth branch input by using the fifth branch network to obtain a fourth feature image corresponding to the fifth branch network, and processing the sixth branch input by using the sixth branch network to obtain a fourth feature image corresponding to the sixth branch network; and
  the plurality of fourth feature images comprises the fourth feature image corresponding to the fourth branch network, the fourth feature image corresponding to the fifth branch network and the fourth feature image corresponding to the sixth branch network.

17. A storage medium, storing computer readable instructions non-transitorily, wherein upon the computer readable instructions being executed by a computer, the image processing method according to claim 1 is executed.

* * * * *